United States Patent [19]
Ono

[11] Patent Number: 5,731,916
[45] Date of Patent: Mar. 24, 1998

[54] IMAGE TRANSMITTING OPTICAL SYSTEM

[75] Inventor: Katsuya Ono, Tokyo-to, Japan

[73] Assignee: Olympus Optical Co., Ltd., Tokyo, Japan

[21] Appl. No.: 33,460

[22] Filed: Mar. 18, 1993

Related U.S. Application Data

[63] Continuation-in-part of Ser. No. 820,923, Jan. 15, 1992, abandoned.

[30] Foreign Application Priority Data

Jan. 16, 1991 [JP] Japan ................... 3-014930

[51] Int. Cl.$^6$ ........................................... G02B 9/04
[52] U.S. Cl. ................ 359/793; 359/435; 359/717; 359/796
[58] Field of Search ........................ 359/434–435, 359/708, 715, 717, 796, 793

[56] References Cited

U.S. PATENT DOCUMENTS

| | | | |
|---|---|---|---|
| 3,257,902 | 6/1966 | Hopkins | 359/435 |
| 4,354,730 | 10/1982 | Bel | 359/434 |
| 4,545,652 | 10/1985 | Hoogland | 359/435 |
| 4,779,613 | 10/1988 | Hashiguchi et al. | 359/513 |
| 4,946,267 | 8/1990 | Hoogland | 359/737 |
| 5,005,960 | 4/1991 | Heimbeck | 359/435 |
| 5,020,893 | 6/1991 | Karst et al. | 359/793 |
| 5,059,009 | 10/1991 | McKinley | 359/435 |
| 5,097,359 | 3/1992 | McKinley | 359/435 |
| 5,142,410 | 8/1992 | Ono et al. | 359/435 |
| 5,206,759 | 4/1993 | Ono et al. | 359/434 |

FOREIGN PATENT DOCUMENTS

| | | |
|---|---|---|
| 3709021 | 9/1988 | Germany . |
| 49-5993 | 2/1974 | Japan . |
| 22-72512 | 11/1990 | Japan . |
| 22-72513 | 11/1990 | Japan . |
| 4-93909 | 3/1992 | Japan . |

*Primary Examiner*—James Phan
*Attorney, Agent, or Firm*—Cushman, Darby & Cushman IP Group of Pillsbury, Madison & Sutro LLP

[57] ABSTRACT

An image transmitting optical system comprising at least two bar-shaped lens components and constructed to have a numerical aperture enlarged by reserving an adequate space between an image of object to be transmitted and one of surfaces of the bar-shaped lens component which is located closest to the image of the object. In this image transmitting optical system, spherical aberration and curvature of coma are corrected by designing each of the bar-shaped lens components as a cemented lens component consisting of two bar-shaped lens elements.

16 Claims, 13 Drawing Sheets

IMAGE TRANSMITTING OPTICAL SYSTEM

This is a continuation-in-part of application Ser. No. 07/820,923, filed on Jan. 15, 1992 now abandoned.

BACKGROUND OF THE INVENTION a) Field of the Invention

The present invention relates to an image transmitting optical system which functions to relay an image formed by an objective lens system while reimaging the image one or more times through a non-flexible endoscope or a similar instrument.

b) Description of Prior Art

A variety of contrivances are made in image transmitting optical systems to be used in non-flexible endoscopes or the similar instruments for obtaining images of good quality to be observed through the instruments. As one of the contrivances to obtain a brighter image, spaces contained in a relay lens system are filled with a glass material for enlarging the numerical aperture (NA) of this relay lens system. In case of an image transmitting optical system which is composed of a plurality of positive lens components arranged with spaces reserved therebetween, for example, it is possible to enlarge the numerical aperture of this optical system to $N^2$ times as large by filling these spaces with a glass material having a refractive index of N.

As a conventional example of the image transmitting optical systems which have numerical apertures enlarged by reducing the number of lens components thereof as described above, there is known the optical system disclosed by Japanese Patent Kokoku Publication No. Sho 49-5993 which has the composition illustrated in FIG. 1 as well as the optical system shown in FIG. 2.

In recent years, the prevalence of video cameras makes it popular to use video cameras for picking up images formed by endoscopes.

Under such a circumstance, however, an inconvenience is produced in that images which can be observed clearly by human eyes may be too dark for observation through video cameras since video cameras adopt image pickup devices having sensitivities not as great as that of the human eye. It is therefore demanded to develop an optical system having a numerical aperture larger than those of the conventional optical systems.

The optical system disclosed by Japanese Patent Kokoku Publication No. Sho 49-5993 mentioned above, in which the spaces are filled with a glass material, has a numerical aperture approximately $N^2$ times as large as that of a relay lens system which is composed only of thin lens elements and has the same length as that of the optical system (the reference symbol N represents a refractive index of the glass material). However, since total quantity of light to be allowed to transmit through a relay lens system is not determined only by the refractive index N of a glass material but dependent also on power distribution in the relay lens system, it is impossible to make maximum the total quantity of light to be allowed to transmit through the relay lens system simply by filling all the spaces with a glass material.

The image transmitting optical system disclosed by the above-mentioned Japanese patent consists of a plurality of lens units, each composed of two bar-shaped cemented lens components, each of which in turn consists of a biconvex bar-shaped lens element and a thin meniscus lens element. This conventional image transmitting optical system has favorably corrected spherical aberration and chromatic aberration, and produces nearly no coma. That is to say, each of the lens components consists of two types of lens elements and each lens unit is composed of four lens elements.

In addition, the image transmitting optical system disclosed by German Patent Publication No. 3709021A1 uses, as shown in FIG. 3, bar-shaped cemented lens components each of which consists of a bar-shaped convexo-concave lens element and a thin biconvex lens element.

Though the lens component used in the image transmitting optical system disclosed by this German patent has a cemented surface which is curved in the direction opposite to that of the cemented lens component adopted for the image transmitting optical system proposed by Japanese Patent Kokoku Publication No. Sho 49-5993, both the types of the cemented surfaces have negative refractive powers or similar functions in these two conventional examples.

An image transmitting optical system is an imaging lens system for forming a real image and is characterized in that it is designed as a nearly afocal lens system for transmitting a pupil.

In order that an image transmitting optical system has this characteristic, it is necessary for an image transmitting optical system to comprise an imaging lens element and a pupil imaging lens element (field lens element). Since the imaging lens element and the field lens element are imaging systems for forming real images, these lens elements have positive refractive powers.

In each of the conventional examples described above, the lens element which is arranged in the vicinity of the image to be transmitted and has the positive refractive power is used as the field lens element, whereas the lens element which is located in the vicinity of the location of the pupil and has the positive refractive power is adopted as the imaging lens element. The cemented surfaces having the negative refractive powers serve for correcting aberrations.

In each of the conventional image transmitting optical systems described above, spherical aberration is corrected, while keeping the focal length of the imaging lens element unchanged, by arranging the cemented surface having the negative refractive power in the vicinity of the location of pupil and adjusting bendings of the surfaces having the positive refractive powers, whereas chromatic aberration is corrected by adjusting Abbe's numbers of the lens elements arranged before and after the cemented surfaces.

Moreover, these conventional image transmitting optical systems produce little asymmetrical coma since the lens components are symmetrical with regard to the pupils.

However, astigmatism is not corrected at all in each of the conventional image transmitting optical systems described above. As a measure for correcting this defect, the astigmatism produced by the image transmitting optical systems is corrected with objective lens systems in the conventional optical systems for endoscopes. When a larger number of relay lens units are used in the image transmitting optical systems, however, astigmatism is inevitably aggravated and cannot be corrected sufficiently with objective lens systems.

In addition, the image transmitting optical system disclosed by Japanese Patent Kokoku Publication No. Sho 49-5993 comprises a surface which is arranged close to the image of the object and has a defect in that it allows observation of dust which adheres to this surface. This patent adopts a measure to locate the surface farther from the image, but this measure results in aggravation of astigmatism and makes it more difficult to correct the astigmatism.

SUMMARY OF THE INVENTION

A primary object of the present invention is to provide an image transmitting optical system which is composed of two or more bar-shaped lens components and constructed to allow a maximum quantity of light to transmit through this optical system.

Another object of the present invention is to provide an image transmitting optical system which comprises bar-shaped cemented lens components each consisting of at least two bar-shaped lens elements and is constructed to produce astigmatism in a state suited for being cancelled with astigmatism to be produced by an objective lens system.

The image transmitting optical system for reimaging an image of object according to the present invention comprises two bar-shaped lens components and satisfies the following condition (1):

$$0.35 \geq D_1/l \geq 0.095 \quad (1)$$

wherein the reference symbol $D_1$ represents a distance as measured to the image of the object from the surface of the lens unit which is arranged on the side of the image of object, and the reference symbol $l$ designates a length equal to ½ of the relay length (the distance as measured from the image of object to the image which is reimaged by the lens unit of the image transmitting optical system). Moreover, it is preferable if the lower limit of condition (1) is 0.1.

In the image transmitting optical system which has the composition illustrated in FIG. 1 or is known well as Hopkins' optical system, the air-contact surface and the cemented surface of each of the bar-shaped lens element have refractive powers. A power distribution in this optical system is schematically shown in FIG. 4. Speaking concretely, a thin lens element $L_1$ corresponding to the surface of incidence of the bar-shaped lens element is arranged at a location at a distance of $D_1$ as measured from the image of the object $I_1$ and a thin lens element $L_2$ which corresponds to a lens element consisting of the cemented surface of the bar-shaped lens element and the emergence side air-contact surface is arranged at a location at a distance of $D_2$ as measured from the thin lens element $L_1$. The distance $D_2$ between the thin lens element $L_1$ and the thin lens element $L_2$ corresponds to a length of the glass material of the bar-shaped lens element and an average refractive index n of the glass material filling the space between the thin lens elements $L_1$ and $L_2$ is defined as follows:

n=(optical path length between the two thin lens elements)/(actual distance)

Since this image transmitting optical system comprises another bar-shaped lens component, it can be considered that the surfaces having the refractive powers are located symmetrically with regard to a point located at a distance of $D_3$ as measured from the emergence side of the thin lens element $L_2$ (the location of the pupil).

Taking this type of optical system as an example, a detailed description will be made of a quantity of light to be transmitted through the image transmitting optical system.

FIG. 5 shows a half of the section of the image transmitting optical system illustrated in FIG. 4. In FIG. 5, let us represent focal lengths of the two thin lens elements $L_1$ and $L_2$ by $f_1$ and $f_2$ respectively, and assume that the incidence side and the emergence side of the thin lens elements are filled with air (having a refractive index of approximately 1), and that the space between the thin lens element $L_1$ and the thin lens element $L_2$ is filled with a medium having a refractive index of n.

A marginal ray coming from an object point located on the optical axis is incident on the pupil as a ray in parallel with the optical axis. Let us examine the relationship between a power distribution and a quantity of light allowed to transmit through an optical system, assuming that $D_1+D_2+D_3$ is constant, i.e., the distance as measured from the object point to the pupil remains unchanged.

For simplicity of calculation, let us assume that a total lens system composed of the thin lens element $L_1$ and the thin lens element $L_2$ has a rear focal point at a location at the distance of $D_2$ as measured from the thin lens element $L_2$. This assumption means that the thin lens element $L_2$ is arranged at the location of the rear focal point of the total lens system when the medium filling the section between the thin lens element $L_1$ and the thin lens element $L_2$ has a refractive index of 1, and that the thin lens element $L_2$ functions in this case as the field lens element in the strict sense of the term for imaging of the pupil. Though this optical system cannot actually function strictly as described above, it can be considered that this example can provide an accurate approximation even when the medium filling the space between these lens elements has the refractive index of n since the thin lens element $L_2$ functions almost completely as the field lens element for imaging the pupil.

First, let us examine the behavior of a light beam transmitting through this image transmitting optical system. Out of rays emitted from a surface of an object P, a ray $l_1$ which is emitted from an axial or paraxial point as shown in FIG. 6 is refracted by the thin lens element $L_1$ and then eclipsed by the an edge of the thin lens element $L_2$. In contrast, another ray $l_2$ which is emitted from a point relatively far from the opical axis is eclipsed by an edge of the thin lens element $L_1$. It is therefore understood that the edge of the thin lens element $L_2$ functions as a stop for rays emitted from object points having low image heights and the edge of the thin lens element $L_1$ functions as a stop for rays emitted from object points having high image heights.

An image height p which is to be considered as the boundary between the region of image heights wherein the thin lens element $L_1$ functions as a stop and another region of image heights wherein the thin lens element $L_2$ functions as a stop is given by the formula shown below:

$$p=(f_1-D_1)/f_1$$

The fact described above can be schematically visualized as shown in FIG. 7 wherein the reference symbol r represents a radius of the thin lens element $L_1$.

A light beam which is emitted from an object point having an image height of x higher than the above-mentioned image height p is incident toward a circle $C_1$ having a radius of r and the upper ray of this light beam is eclipsed by the upper edge of the circle $C_1$ as shown in FIG. 7. After passing through the image transmitting optical system, the light beam forms an inverted image Q' having the image height x at a magnification of −1x as shown in FIG. 8. Since this optical system is symmetrical, the relationship between a thin lens element $L_1'$ and the image is same as the relationship between the thin lens element $L_1$ and the image of object which is set upside down. Accordingly, the rays which are to reach the image point Q' come from the circle $C_1$ having the radius r to the location having the image height of −x. That is to say, the lower ray of the light beam is eclipsed by the lower edge of the thin lens element $L_1$ (or the lower edge of the circle $C_1$).

As is understood from the foregoing description, the quantity of rays which are emitted from an object point having the image height x and are allowed to reach the image point Q' is determined by area S of a region which is enclosed between the two circles $C_1$ and $C_1'$, and represented by a reference symbol S in FIG. 7.

On the other hand, a quantity of a light beam which is emitted from an object point having an image height lower than p can be considered in a manner similar to that described above since the lens elements $L_2$ and $L_2'$ function as stops for this light beam. As is clear from FIG. 8, however, the light beam emitted from the object point having an image height lower than p can be regarded as if it where incident, without being refracted in the course thereof, on an image $L_I$ of the thin lens element $L_2$ which is formed by the thin lens element $L_1$. Assuming that the thin lens element $L_2'$ has an imaging magnification of $\beta$, it is possible, since the thin lens element $L_2$ also has the radius r, to consider that the quantity of the light beam emitted from the object point having the image height lower than p is determined by an area S' of a region enclosed by circles $C_2$ and $C_2'$ having a radius of $\beta r$.

Consequently, a total quantity of light which is allowed to transmit through the image transmitting optical system is determined as a total sum of a quantity of the light beams emitted from object points having image heights from 0 to p which is determined by the area S' of the region enclosed by the circles $C_2$ and $C_2'$, and a quantity of light beams emitted from object points having image heights from p to the maximum image height (r when field ratio is 100%) which is determined by the area S of the region enclosed by the circles $C_1$ and $C_1'$.

When the distance $D_1$ as measured from the image of the object to the thin lens element $L_1$ and the distance as measured from the image of object to the image $L_I$ of the thin lens element $L_2$ are taken into consideration, the total quantity I of the light to be allowed to transmit through the image transmitting optical system can be calculated by the following formula:

$$I = \frac{1}{\{D_1 + \beta(D_2/n)\}^2} \int_0^P 2\pi s'(x)x\,dx + \frac{1}{(D_1)^2} \int_P^K 2\pi s(x)x\,dx \quad (i)$$

The formula (i) mentioned above gives an approximate quantity (i) of light since the quantity of a light beam emitted from a certain image height within the range from p to the maximum image height cannot be represented exactly by the area S. However, it is possible in all cases to estimate a quantity of light to be allowed to transmit through the image transmitting optical system with sufficiently high accuracy by using S and S'.

On the basis of the formula (i) mentioned above, the quantity of light to be allowed to transmit through the image transmitting optical system is determined as described below:

By using various values of the average refractive index n and an image height ratio k, total quantities of light to be allowed to transmit through the image transmitting optical system were calculated while changing values of $D_1$ and $D_3$ at various levels as listed in the following tables. The image height ratio k represents is values which are obtained by normalizing an image height to the radius r of the thin lens element $L_1$.

TABLE 1 n = 1.5  k = 0.9

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 3.266 | 3.334 | 3.367 | 3.347 | 3.259 | 3.082 | 2.797 | 2.401 | 0.000 |
| 0.100 | 4.062 | 4.001 | 3.879 | 3.683 | 3.401 | 3.089 | 2.769 | 2.374 | 0.000 |
| 0.150 | 4.306 | 4.211 | 4.060 | 3.844 | 3.556 | 3.189 | 2.744 | 2.348 | 0.000 |
| 0.200 | 4.255 | 4.140 | 3.981 | 3.770 | 3.501 | 3.167 | 2.765 | 2.324 | 0.000 |

TABLE 1-continued n = 1.5  k = 0.9

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.250 | 4.013 | 3.900 | 3.755 | 3.572 | 3.344 | 3.062 | 2.719 | 2.313 | 0.000 |
| 0.300 | 3.602 | 3.514 | 3.405 | 3.271 | 3.103 | 2.892 | 2.624 | 2.288 | 1.906 |
| 0.350 | 3.047 | 3.002 | 2.946 | 2.873 | 2.778 | 2.650 | 2.473 | 2.228 | 1.894 |
| 0.400 | 2.426 | 2.423 | 2.414 | 2.397 | 2.369 | 2.322 | 2.244 | 2.110 | 1.878 |
| 0.450 | 0.000 | 0.000 | 0.000 | 0.000 | 1.918 | 1.917 | 1.911 | 1.887 | 1.805 |

TABLE 2 n = 1.5  k = 0.8

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 2.600 | 2.679 | 2.737 | 2.763 | 2.744 | 2.664 | 2.508 | 2.262 | 0.000 |
| 0.100 | 2.858 | 2.899 | 2.910 | 2.882 | 2.805 | 2.672 | 2.476 | 2.218 | 0.000 |
| 0.150 | 3.495 | 3.399 | 3.248 | 3.033 | 2.862 | 2.678 | 2.449 | 2.179 | 0.000 |
| 0.200 | 3.799 | 3.684 | 3.525 | 3.314 | 3.045 | 2.711 | 2.425 | 2.145 | 0.000 |
| 0.250 | 3.721 | 3.608 | 3.463 | 3.280 | 3.052 | 2.770 | 2.427 | 2.114 | 0.000 |
| 0.300 | 3.399 | 3.311 | 3.202 | 3.068 | 2.900 | 2.689 | 2.421 | 2.087 | 1.804 |
| 0.350 | 2.898 | 2.853 | 2.797 | 2.724 | 2.629 | 2.501 | 2.324 | 2.079 | 1.781 |
| 0.400 | 2.312 | 2.309 | 2.300 | 2.283 | 2.255 | 2.208 | 2.130 | 1.996 | 1.764 |
| 0.450 | 0.000 | 0.000 | 0.000 | 0.000 | 0.000 | 1.827 | 1.821 | 1.797 | 1.715 |

TABLE 3 n = 1.5  k = 0.7

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 2.005 | 2.085 | 2.155 | 2.206 | 2.231 | 2.220 | 2.158 | 2.033 | 0.000 |
| 0.100 | 2.205 | 2.259 | 2.294 | 2.304 | 2.284 | 2.226 | 2.126 | 1.978 | 0.000 |
| 0.150 | 2.432 | 2.447 | 2.438 | 2.401 | 2.333 | 2.232 | 2.098 | 1.932 | 0.000 |
| 0.200 | 2.951 | 2.836 | 2.677 | 2.496 | 2.379 | 2.238 | 2.074 | 1.892 | 0.000 |
| 0.250 | 3.178 | 3.065 | 2.920 | 2.737 | 2.509 | 2.242 | 2.054 | 1.858 | 0.000 |
| 0.300 | 3.022 | 2.934 | 2.825 | 2.691 | 2.524 | 2.312 | 2.045 | 1.828 | 1.628 |
| 0.350 | 2.621 | 2.576 | 2.520 | 2.448 | 2.352 | 2.224 | 2.047 | 1.802 | 1.599 |
| 0.400 | 2.100 | 2.097 | 2.088 | 2.071 | 2.043 | 1.996 | 1.918 | 1.784 | 1.573 |
| 0.450 | 0.000 | 0.000 | 0.000 | 0.000 | 0.000 | 1.659 | 1.653 | 1.630 | 1.548 |

TABLE 4 n = 1.5  k = 0.6

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 1.484 | 1.557 | 1.626 | 1.688 | 1.737 | 1.766 | 1.766 | 1.728 | 0.000 |
| 0.100 | 1.633 | 1.688 | 1.733 | 1.765 | 1.780 | 1.772 | 1.736 | 1.670 | 0.000 |
| 0.150 | 1.802 | 1.830 | 1.845 | 1.842 | 1.810 | 1.777 | 1.711 | 1.623 | 0.000 |
| 0.200 | 1.994 | 1.985 | 1.960 | 1.917 | 1.857 | 1.781 | 1.689 | 1.583 | 0.000 |
| 0.250 | 2.413 | 2.300 | 2.155 | 1.990 | 1.892 | 1.785 | 1.670 | 1.549 | 0.000 |
| 0.300 | 2.491 | 2.402 | 2.294 | 2.160 | 1.992 | 1.789 | 1.654 | 1.520 | 1.388 |
| 0.350 | 2.230 | 2.186 | 2.130 | 2.057 | 1.962 | 1.833 | 1.657 | 1.494 | 1.358 |
| 0.400 | 1.801 | 1.798 | 1.789 | 1.772 | 1.744 | 1.697 | 1.619 | 1.485 | 1.330 |
| 0.450 | 0.000 | 0.000 | 0.000 | 0.000 | 0.000 | 1.423 | 1.417 | 1.393 | 1.312 |

TABLE 5 n = 1.5  k = 0.5

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 1.038 | 1.099 | 1.160 | 1.219 | 1.274 | 1.322 | 1.356 | 1.370 | 0.000 |
| 0.100 | 1.143 | 1.192 | 1.237 | 1.277 | 1.307 | 1.326 | 1.330 | 1.317 | 0.000 |
| 0.150 | 1.261 | 1.294 | 1.318 | 1.334 | 1.338 | 1.330 | 1.309 | 1.274 | 0.000 |
| 0.200 | 1.397 | 1.404 | 1.402 | 1.390 | 1.367 | 1.334 | 1.291 | 1.238 | 0.000 |
| 0.250 | 1.552 | 1.524 | 1.488 | 1.444 | 1.394 | 1.337 | 1.275 | 1.208 | 0.000 |
| 0.300 | 1.846 | 1.758 | 1.650 | 1.515 | 1.419 | 1.340 | 1.261 | 1.182 | 1.104 |
| 0.350 | 1.757 | 1.712 | 1.656 | 1.584 | 1.488 | 1.360 | 1.248 | 1.160 | 1.075 |
| 0.400 | 1.439 | 1.435 | 1.426 | 1.410 | 1.381 | 1.334 | 1.256 | 1.140 | 1.050 |
| 0.450 | 0.000 | 0.000 | 0.000 | 0.000 | 0.000 | 1.137 | 1.131 | 1.107 | 1.028 |

TABLE 6 n = 1.6  k = 0.9

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 3.692 | 3.741 | 3.743 | 3.679 | 3.532 | 3.281 | 2.913 | 0.000 | 0.000 |
| 0.100 | 4.586 | 4.472 | 4.286 | 4.015 | 3.649 | 3.261 | 2.868 | 2.410 | 0.000 |
| 0.150 | 4.774 | 4.624 | 4.411 | 4.129 | 3.769 | 3.329 | 2.829 | 2.383 | 0.000 |
| 0.200 | 4.641 | 4.479 | 4.268 | 4.004 | 3.679 | 3.288 | 2.831 | 2.356 | 0.000 |
| 0.250 | 4.297 | 4.150 | 3.970 | 3.751 | 3.485 | 3.164 | 2.780 | 2.336 | 0.000 |
| 0.300 | 3.770 | 3.667 | 3.543 | 3.392 | 3.205 | 2.971 | 2.677 | 2.313 | 1.914 |
| 0.350 | 3.106 | 3.065 | 3.010 | 2.937 | 2.838 | 2.703 | 2.515 | 2.252 | 1.900 |
| 0.400 | 0.000 | 2.427 | 2.423 | 2.412 | 2.389 | 2.345 | 2.268 | 2.130 | 1.885 |
| 0.450 | 0.000 | 0.000 | 0.000 | 0.000 | 0.000 | 1.918 | 1.914 | 1.894 | 1.812 |

TABLE 7 n = 1.6  k = 0.8

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 2.941 | 3.010 | 3.049 | 3.047 | 2.990 | 2.860 | 2.643 | 0.000 | 0.000 |
| 0.100 | 3.225 | 3.242 | 3.220 | 3.151 | 3.026 | 2.840 | 2.590 | 2.279 | 0.000 |
| 0.150 | 3.963 | 3.813 | 3.600 | 3.318 | 3.060 | 2.823 | 2.545 | 2.232 | 0.000 |
| 0.200 | 4.185 | 4.022 | 3.812 | 3.548 | 3.223 | 2.832 | 2.506 | 2.190 | 0.000 |
| 0.250 | 4.005 | 3.857 | 3.678 | 3.459 | 3.193 | 2.872 | 2.488 | 2.153 | 0.000 |
| 0.300 | 3.567 | 3.464 | 3.340 | 3.189 | 3.002 | 2.768 | 2.475 | 2.119 | 1.819 |
| 0.350 | 2.957 | 2.916 | 2.861 | 2.788 | 2.689 | 2.554 | 2.366 | 2.103 | 1.793 |
| 0.400 | 0.000 | 2.313 | 2.309 | 2.298 | 2.275 | 2.231 | 2.154 | 2.016 | 1.771 |
| 0.450 | 0.000 | 0.000 | 0.000 | 0.000 | 0.000 | 1.827 | 1.824 | 1.804 | 1.722 |

TABLE 8 n = 1.6  k = 0.7

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 2.269 | 2.346 | 2.405 | 2.441 | 2.444 | 2.400 | 2.298 | 0.000 | 0.000 |
| 0.100 | 2.490 | 2.529 | 2.543 | 2.527 | 2.476 | 2.382 | 2.242 | 2.055 | 0.000 |
| 0.150 | 2.739 | 2.726 | 2.684 | 2.611 | 2.505 | 2.366 | 2.196 | 1.996 | 0.000 |
| 0.200 | 3.337 | 3.174 | 2.964 | 2.700 | 2.532 | 2.352 | 2.155 | 1.945 | 0.000 |
| 0.250 | 3.462 | 3.315 | 3.135 | 2.916 | 2.650 | 2.340 | 2.121 | 1.902 | 0.000 |
| 0.300 | 3.190 | 3.087 | 2.964 | 2.812 | 2.625 | 2.391 | 2.098 | 1.863 | 1.648 |
| 0.350 | 2.680 | 2.639 | 2.584 | 2.511 | 2.412 | 2.277 | 2.089 | 1.829 | 1.614 |
| 0.400 | 0.000 | 2.101 | 2.097 | 2.086 | 2.063 | 2.019 | 1.942 | 1.804 | 1.584 |
| 0.450 | 0.000 | 0.000 | 0.000 | 0.000 | 0.000 | 1.660 | 1.657 | 1.637 | 1.555 |

TABLE 9 n = 1.6  k = 0.6

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 1.681 | 1.753 | 1.820 | 1.874 | 1.911 | 1.922 | 1.898 | 0.000 | 0.000 |
| 0.100 | 1.844 | 1.892 | 1.926 | 1.942 | 1.937 | 1.906 | 1.845 | 1.752 | 0.000 |
| 0.150 | 2.030 | 2.041 | 2.034 | 2.008 | 1.961 | 1.892 | 1.801 | 1.689 | 0.000 |
| 0.200 | 2.240 | 2.201 | 2.145 | 2.072 | 1.983 | 1.880 | 1.764 | 1.637 | 0.000 |
| 0.250 | 2.696 | 2.549 | 2.369 | 2.151 | 2.004 | 1.869 | 1.732 | 1.592 | 0.000 |
| 0.300 | 2.659 | 2.556 | 2.432 | 2.281 | 2.094 | 1.860 | 1.704 | 1.554 | 1.410 |
| 0.350 | 2.289 | 2.248 | 2.194 | 2.120 | 2.022 | 1.886 | 1.698 | 1.521 | 1.374 |
| 0.400 | 0.000 | 1.802 | 1.798 | 1.787 | 1.764 | 1.720 | 1.643 | 1.505 | 1.342 |
| 0.450 | 0.000 | 0.000 | 0.000 | 0.000 | 0.000 | 1.424 | 1.420 | 1.400 | 1.319 |

TABLE 10 n = 1.6  k = 0.5

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 1.176 | 1.239 | 1.300 | 1.357 | 1.408 | 1.447 | 1.468 | 0.000 | 0.000 |
| 0.100 | 1.291 | 1.338 | 1.377 | 1.408 | 1.428 | 1.434 | 1.423 | 1.392 | 0.000 |
| 0.150 | 1.422 | 1.444 | 1.456 | 1.458 | 1.447 | 1.423 | 1.385 | 1.334 | 0.000 |
| 0.200 | 1.570 | 1.559 | 1.537 | 1.505 | 1.464 | 1.413 | 1.353 | 1.286 | 0.000 |
| 0.250 | 1.769 | 1.681 | 1.619 | 1.551 | 1.480 | 1.404 | 1.326 | 1.246 | 0.000 |
| 0.300 | 2.014 | 1.912 | 1.788 | 1.637 | 1.494 | 1.397 | 1.303 | 1.212 | 1.125 |
| 0.350 | 1.816 | 1.775 | 1.720 | 1.647 | 1.548 | 1.413 | 1.282 | 1.183 | 1.091 |

TABLE 10-continued n = 1.6  k = 0.5

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.400 | 0.000 | 1.439 | 1.436 | 1.425 | 1.401 | 1.358 | 1.280 | 1.157 | 1.061 |
| 0.450 | 0.000 | 0.000 | 0.000 | 0.000 | 0.000 | 1.137 | 1.134 | 1.114 | 1.035 |

TABLE 11 n = 1.7  k = 0.9

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 4.142 | 4.164 | 4.126 | 4.010 | 3.794 | 3.463 | 3.007 | 0.000 | 0.000 |
| 0.100 | 5.126 | 4.949 | 4.690 | 4.336 | 3.880 | 3.417 | 2.951 | 0.000 | 0.000 |
| 0.150 | 5.246 | 5.034 | 4.755 | 4.401 | 3.968 | 3.454 | 2.901 | 2.409 | 0.000 |
| 0.200 | 5.019 | 4.806 | 4.543 | 4.224 | 3.844 | 3.397 | 2.887 | 2.381 | 0.000 |
| 0.250 | 4.560 | 4.381 | 4.169 | 3.916 | 3.614 | 3.255 | 2.833 | 2.353 | 0.000 |
| 0.300 | 3.911 | 3.800 | 3.665 | 3.500 | 3.297 | 3.042 | 2.724 | 2.333 | 0.000 |
| 0.350 | 3.142 | 3.110 | 3.060 | 2.989 | 2.800 | 2.749 | 2.551 | 2.273 | 1.906 |
| 0.400 | 0.000 | 0.000 | 2.427 | 2.421 | 2.403 | 2.364 | 2.289 | 2.147 | 1.891 |
| 0.450 | 0.000 | 0.000 | 0.000 | 0.000 | 0.000 | 0.000 | 1.916 | 1.900 | 1.819 |

TABLE 12 n = 1.7  k = 0.8

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 3.300 | 3.354 | 3.369 | 3.333 | 3.230 | 3.044 | 2.762 | 0.000 | 0.000 |
| 0.100 | 3.611 | 3.595 | 3.533 | 3.417 | 3.239 | 2.997 | 2.690 | 0.000 | 0.000 |
| 0.150 | 4.435 | 4.223 | 3.944 | 3.590 | 3.248 | 2.957 | 2.629 | 2.276 | 0.000 |
| 0.200 | 4.563 | 4.349 | 4.087 | 3.768 | 3.387 | 2.941 | 2.577 | 2.229 | 0.000 |
| 0.250 | 4.268 | 4.089 | 3.877 | 3.624 | 3.322 | 2.963 | 2.541 | 2.185 | 0.000 |
| 0.300 | 3.709 | 3.597 | 3.462 | 3.297 | 3.094 | 2.840 | 2.522 | 2.146 | 0.000 |
| 0.350 | 2.993 | 2.961 | 2.911 | 2.840 | 2.741 | 2.600 | 2.402 | 2.124 | 1.804 |
| 0.400 | 0.000 | 0.000 | 2.312 | 2.307 | 2.289 | 2.250 | 2.174 | 2.033 | 1.777 |
| 0.450 | 0.000 | 0.000 | 0.000 | 0.000 | 0.000 | 0.000 | 1.826 | 1.810 | 1.729 |

TABLE 13 n = 1.7 k = 0.7

| $D_1/D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 2.548 | 2.617 | 2.664 | 2.680 | 2.654 | 2.574 | 2.427 | 0.000 | 0.000 |
| 0.100 | 2.789 | 2.808 | 2.796 | 2.750 | 2.662 | 2.529 | 2.349 | 0.000 | 0.000 |
| 0.150 | 3.059 | 3.010 | 2.930 | 2.816 | 2.669 | 2.491 | 2.284 | 2.052 | 0.000 |
| 0.200 | 3.715 | 3.501 | 3.239 | 2.920 | 2.676 | 2.458 | 2.228 | 1.992 | 0.000 |
| 0.250 | 3.726 | 3.547 | 3.334 | 3.081 | 2.780 | 2.429 | 2.181 | 1.940 | 0.000 |
| 0.300 | 3.332 | 3.220 | 3.085 | 2.921 | 2.717 | 2.463 | 2.145 | 1.894 | 0.000 |
| 0.350 | 2.716 | 2.684 | 2.634 | 2.263 | 2.464 | 2.324 | 2.126 | 1.853 | 1.628 |
| 0.400 | 0.000 | 0.000 | 2.100 | 2.095 | 2.077 | 2.038 | 1.962 | 1.821 | 1.594 |
| 0.450 | 0.000 | 0.000 | 0.000 | 0.000 | 0.000 | 0.000 | 1.659 | 1.642 | 1.561 |

TABLE 14 n = 1.7 k = 0.6

| $D_1\backslash D_3$ | 0.050 | 0.100 | 0.150 | 0.200 | 0.250 | 0.300 | 0.350 | 0.400 | 0.450 |
|---|---|---|---|---|---|---|---|---|---|
| 0.050 | 1.888 | 1.959 | 2.019 | 2.063 | 2.084 | 2.074 | 2.023 | 0.000 | 0.000 |
| 0.100 | 2.067 | 2.103 | 2.122 | 2.119 | 2.091 | 2.035 | 1.947 | 0.000 | 0.000 |
| 0.150 | 2.269 | 2.257 | 2.225 | 2.172 | 2.097 | 2.001 | 1.884 | 1.748 | 0.000 |
| 0.200 | 2.519 | 2.420 | 2.328 | 2.222 | 2.103 | 1.972 | 1.832 | 1.685 | 0.000 |
| 0.250 | 2.960 | 2.781 | 2.569 | 2.316 | 2.108 | 1.947 | 1.788 | 1.631 | 0.000 |
| 0.300 | 2.800 | 2.688 | 2.554 | 2.389 | 2.185 | 1.931 | 1.749 | 1.585 | 0.000 |
| 0.350 | 2.326 | 2.293 | 2.244 | 2.173 | 2.073 | 1.933 | 1.735 | 1.544 | 1.389 |
| 0.400 | 0.000 | 0.000 | 1.801 | 1.796 | 1.778 | 1.739 | 1.663 | 1.522 | 1.352 |
| 0.450 | 0.000 | 0.000 | 0.000 | 0.000 | 0.000 | 0.000 | 1.422 | 1.406 | 1.325 |

TABLE 15

| n = 1.7 k = 0.5 | | | | | | | | | |
|---|---|---|---|---|---|---|---|---|---|
| $D_1[D]_3$ | 0.050 | 0.100 | 0.150 | 0.200 | 0.250 | 0.300 | 0.350 | 0.400 | 0.450 |
| 0.050 | 1.322 | 1.385 | 1.445 | 1.499 | 1.542 | 1.571 | 1.578 | 0.000 | 0.000 |
| 0.100 | 1.448 | 1.489 | 1.520 | 1.541 | 1.548 | 1.538 | 1.510 | 0.000 | 0.000 |
| 0.150 | 1.590 | 1.599 | 1.596 | 1.581 | 1.552 | 1.511 | 1.456 | 1.389 | 0.000 |
| 0.200 | 1.750 | 1.715 | 1.671 | 1.618 | 1.557 | 1.487 | 1.411 | 1.330 | 0.000 |
| 0.250 | 2.032 | 1.853 | 1.747 | 1.654 | 1.561 | 1.467 | 1.374 | 1.281 | 0.000 |
| 0.300 | 2.156 | 2.044 | 1.909 | 1.745 | 1.564 | 1.449 | 1.341 | 1.239 | 0.000 |
| 0.350 | 1.853 | 1.820 | 1.770 | 1.700 | 1.600 | 1.460 | 1.313 | 1.204 | 1.104 |
| 0.400 | 0.000 | 0.000 | 1.439 | 1.433 | 1.416 | 1.377 | 1.301 | 1.173 | 1.070 |
| 0.450 | 0.000 | 0.000 | 0.000 | 0.000 | 0.000 | 0.000 | 1.136 | 1.119 | 1.040 |

Out of the tables mentioned above, the one containing n=1.5 and k=0.9, for example, specifies ratios of total light quantity to be allowed to transmit the image transmitting optical system which were obtained at an average refractive index of 1.5 and an image height ratio of 0.9. In each of these tables, the left side column (the vertical line on the left side) and the uppermost line (the uppermost horizontal line) list values of $D_1$ and $D_3$ respectively which were selected from an initial value of 0.05 in steps of 0.05, i.e., 0.05, 0.10, 0.15, . . . with l/2 fixed as a value of 1. Accordingly, ratios of total light quantity to be allowed to transmit through the image transmitting optical system at various values of $D_1$ and $D_3$ are read at the intersections between the left side column and the uppermost line.

As is seen from these tables, the ratio of total light quantity to be allowed for transmission is 3.266 when $D_1$ is 0.05 at $D_3$=0.05, n=1.5 and k=0.9.

As is seen from these tables, a value of $D_1$ of 0.05 gives a ratio of total light quantity of 3.266 and another value of $D_1$ of 0.10 gives a total light quantity ratio of 4.062 at a value of $D_3$ of 0.05 when n is 1.5 and k is 0.9. That is to say, the ratio of total light quantity is enhanced as $D_1$ has a larger value, i.e., as the distance $D_1$ as measured from the image of object to the thin lens element $L_1$ becomes longer, has a peak value when $D_1$ has a value of 0.20 and is lowered when $D_1$ has too large a value of 0.25 or 0.30, or when the distance $D_1$ as measured from the image of object to the thin lens element $L_1$ is too long.

As is understood from the foregoing description, too short a distance or too long a distance between the image of the object and the thin lens element $L_1$ lowers the ratio of total light quantity, and it is possible to obtain a bright image by selecting an adequate value of $D_1$ to allow a large quantity of light to transmit through the image transmitting optical system.

Though the ratio of total light quantity is varied also by changing the value of $D_3$, the variation tendency of the ratio of total light quantity remains unchanged regardless of the change of value in the $D_3$. In other words, the value of 0.2 of $D_3$ always gives a maximum value to the ratio total light quantity when n is 1.5 and k is 0.9.

The maximum value (or optimum value) of the ratio of total light quantity varies along with changes of values of n and k. When n is 1.5 and k is 0.25, for example, the ratio of total light quantity has an optimum value at $D_1$=0.25.

Listed in the tables shown above are fifteen examples with n=1.5, 1.6 or 1.7 being combined with k=0.9, 0.8, 0.7, 0.6, or 0.5. On the basis of the numerical data listed in these tables, it is desirable to increase the amount of transmitted by selecting a lower limit of $D_1/l$ within a range of from 0.1 to 0.5, more preferably within a range of from 0.125 to 0.15, and adopt an upper limit of $D_1/l$ within a range of from 0.3 to 0.35.

The conventional image transmitting optical system has a larger numerical aperture as it comprises a glass material at a higher ratio. That is to say, a shorter distance of $D_1$ is more desirable for obtaining a larger numerical aperture of the conventional image transmitting optical system. When the eclipse of a light beam at the marginal portion of a visual field is taken into consideration, however, it is not always desirable to select a short distance of $D_1$.

As is understood from the foregoing description, the first term of the above-mentioned formula (i) represents the ratio of total light quantity which is under the influence due to the eclipse by the lens element having the imaging function (the thin lens element $L_2$) and the second term of the formula designates the ratio of total light quantity which is under the influence due to the eclipse by the field lens element (the thin lens element $L_1$).

An image which is relayed by a plurality of relay lens units through the image transmitting optical system is formed within a visual field which is not circular due to the eclipse of the marginal portion of the image caused by misalignment of the lens element and so on. In order to obtain a circular visual field, it is preferable to interpose a visual field mask having a diameter approximately 0.5 to 0.9 times as large as the effective diameter of the lens element.

Since the formula (i) is an equation containing two variables when k and n are assumed to be constants respectively, it is possible to determine a power distribution in the image transmitting optical system allowing a maximum quantity of light to transmit therethrough by calculating a maximum value of this equation. The tables mentioned above provide maps which illustrate ratios of total light quantity determined by the formula (i) using $D_1$ and $D_2$ as parameters.

These tables list approximate values which are determined by paraxial calculations, and slightly different from but very close to the actual values of the image transmitting optical system which is affected by aberrations and so on.

Due to problems related to correction of aberrations and so on, the power distribution which should allow the maximum quantity of light to transmit through the image transmitting optical system may not be used for calculations for designing an actual image transmitting optical system. However, light can transmit in a total quantity sufficient for practical use so far as an image transmitting optical system satisfies the above-mentioned condition (1).

The image transmitting optical system according to the present invention satisfies the condition (1) for the reason described above. If the upper limit or the lower limit of the condition (1) is exceeded, light will be allowed to transmit in an insufficient quantity through the image transmitting optical system. In addition, as is clear from the Tables 1 through 15 shown above, the image transmitting optical system according to the present invention exhibits the effect to allow an increased quantity of light to transmit therethrough especially within a range of $0.9 \geq k \geq 0.5$.

Further, it is desirable to select the composition of the image transmitting optical system according to the present invention also for preventing dust adhering to the surface of the field lens element from being visible on the image transmitted through the optical system.

For accomplishing the objects of the present invention, it is desirable to further satisfy the following condition (2):

$$D_3/l \leq 0.3 \qquad (2)$$

wherein the reference symbol $D_3$ represents the distance as measured from the thin lens element $L_2$ to the pupil, i.e., the distance as measured from a surface whichever has the imaging function in the image transmitting optical system and is nearest the pupil to the pupil.

Furthermore, it is desirable that $D_1$ and $D_3$ satisfy the relationship expressed by the following condition (3):

$$D_1 > D_3$$

When the image transmitting optical system according to the present invention is designed, for example with n=1.6 and k=0.7 as listed in Table 8, the optical system is improved at least 10% to 50% at maximum in the ratio of total light quantity as compared with the relay optical system disclosed by Japanese Patent Kokoku Publication No. Sho 49-5993.

Moreover, in order to prevent visual fields from being eclipsed due to misalignment of lens elements and allow increased quantities of light to transmit through image transmitting optical systems, the value of k is set approximately at 0.7 for image transmitting optical systems which are to be used for relaying images five or more times through non-flexible endoscopes or approximately at 0.8 for image transmitting optical systems which are to be used for relaying images about three times through non-flexible endoscopes. For designing these optical systems to allow light to transmit in quantities about 90% of the peak value, it is desirable to satisfy the following conditions (4) and (5):

$$0.3 \geq D_1/l > 0.1 \tag{4}$$

$$0.2 \geq D_2/l \geq 0 \tag{5}$$

Moreover, it is preferable for the upper limit of condition (4) to be 0.35 rather than 0.3 and the lower limit of condition (4) to be 0.125 instead of 0.1.

Since the bar-shaped lens element can hardly correct aberrations, it is desirable for correcting aberrations to design the bar-shaped lens element as a cemented bar-shaped lens component consisting of a plurality of lens elements. For example, it is possible to correct spherical aberration by cementing a lens element to the pupil side surface of the bar-shaped lens element and imparting a negative refractive power to the cemented surface.

Further, chromatic aberration can be corrected by designing a lens element, whichever has the higher refractive index in the cemented lens component, so as to have an Abbe's number larger than that of the lens element having the lower refractive index.

The cemented lens component comprises at least three surfaces which have refractive powers. Since the cemented surface generally has a power which is sufficiently weaker than that of each of the air-contact surfaces, the cemented surface makes nearly no contribution to the transmission of the image or pupil though it serves for correcting aberrations.

Accordingly, this cemented lens component poses no problem in considering the ratio of total light quantity to be allowed to transmit through the optical system while ignoring the cemented surface, or similarly to that allowed to transmit through the composition presented in the conceptional diagram illustrated in FIG. 4.

Furthermore, it is possible to correct aberrations more favorably in the image transmitting optical system according to the present invention by designing at least one of the surfaces of the bar-shaped lens component as an aspherical surface.

Though an image transmitting optical system which has a long focal length and a small numerical aperture usually produces little aberration of pupil, this aberration is aggravated by relaying an image a plurality of times. It is therefore desirable to reduce the aberration of the pupil in each relay lens unit and for this purpose the image transmitting optical system should preferably satisfy the following condition (6):

$$D_1 = D_3 \tag{6}$$

It is possible to correct the aberration of the pupil by constructing the image transmitting optical system to satisfy the condition (6). In a particular case where each of the bar-shaped lens components is symmetrical with the center thereof in the horizontal direction, the quantity of spherical aberration is equal to that of the aberration of the pupil in each relay lens unit. Further, when aspherical surfaces are used in the image transmitting optical system, the aberration of the pupil may be remarkably deviated as compared with that in an optical system which comprises spherical surfaces only. However, the image transmitting optical system satisfying the above-mentioned condition (6) is always desirable from the viewpoint of the correction of the aberration of the pupil. Though the image transmitting optical system satisfying the condition (6) does not always allow the maximum ratio of light quantity to transmit therethrough, this optical system poses no problem related to the brightness of image in practical use since it permits obtaining 80 to 90% of the maximum ratio.

Now, description will be made of an image transmitting optical system comprising two cemented lens components each of which is composed of two bar-shaped lens elements.

When the image transmitting optical system according to the present invention has this composition, it is capable of favorably correcting spherical aberration, chromatic aberration and coma by selecting adequate locations for the cemented surfaces and facilitating favorable correction of astigmatic difference by cancelling the astigmatic difference produced by this optical system with that produced by an objective lens system.

In order to correct the spherical aberration and astigmatic difference which are produced by the convex surfaces in the image transmitting optical system, it is necessary to use surfaces having negative refractive powers in the optical system. For correcting the spherical aberration, it is sufficient to arrange surfaces having negative refractive powers at locations in the vicinity of the pupil.

In order to correct the astigmatic difference, on the other hand, it is necessary to arrange surfaces having negative refractive powers at locations at which the offaxial principal ray is high, or at locations close to the images (the image of object and the reimaged image).

The image transmitting optical system according to the present invention is constructed in such a manner that both the spherical aberration and the astigmatic difference are corrected favorably by arranging the cemented surfaces at the locations at which the offaxial principal ray is relatively high, i.e., at the locations close to the images, while correcting the spherical aberration by adjusting bendings of the convex surface of the imaging lens element and the cemented surfaces having the negative refractive powers. In order to correct the spherical aberration and the astigmatic difference favorably in this case, it is desirable to arrange the cemented surfaces at locations which are not too close to the pupil nor the images. Accordingly, it is desirable that each lens element of the bar-shaped lens components is sufficiently thick, i.e., each lens element has a shape of a bar-shaped lens element.

For the reason described above, the image transmitting optical system according to the present invention is characterized in that it has the composition described above.

Further, the image transmitting optical system which uses the bar-shaped cemented lens components has a length of a single image transmission cycle (a single relay length) which is generally approximately 20 times as long as that of an outside diameter of the lens element used therein. Each lens element of the bar-shaped lens components should desirably have a thickness at least twice the outside diameter thereof.

Once locations of both the ends of each of the bar-shaped cemented lens components are determined, it is possible to uniquely decide the locations of the cemented surfaces having the negative refractive powers to obtain desired quantities of the spherical aberration and the astigmatic difference (for example, spherical aberration of 0 and astigmatic difference of 0) as well as the refractive powers of these surfaces.

For obtaining the spherical aberration and the astigmatic difference in quantities which are convenient for designing, small in absolute values and easy for correction with an objective lens system, it is desirable that the two bar-shaped lens elements have thickness $d_1$ and $d_2$ respectively satisfying the following condition (7):

$$0.4 \leq d_2/d_1 \leq 3.5 \tag{7}$$

Strictly speaking, the condition (7) should define $d_1$ and $d_2$ as optical path lengths respectively. However, a difference of 0.02 to 0.2 in refractive index between the two bar-shaped lens elements is desirable since it is necessary that the lens elements have refractive indices as high as possible in order to obtain a large numerical aperture demanded for the image transmitting optical system and radii of curvature cannot be extremely short on the cemented surfaces from the viewpoint of manufacturing. Further, considering the fact that the space filled with a glass material is sufficiently long as compared with the space filled with air in the image transmitting optical system, it is possible to define $d_1$ and $d_2$ as the thickness of the two bar-shaped lens elements.

Further, when the astigmatic difference and the spherical aberration are corrected nearly to zero respectively in the image transmitting optical system, coma is curved a little by arranging the cemented surfaces at locations which are closer to the images than to the pupil. Though the coma is curved at a degree which is allowable for the ordinary type optical system, this curvature of coma is undesirable for the image transmitting optical system since the coma is multiplied by a number of relay lens units when the image transmitting optical system comprises a plurality of relay lens units.

When it is difficult to correct this curvature of coma with an objective lens system, it is proper to lessen the curvature of coma by producing a little amount of astigmatic difference. For this purpose, it is sufficient to locate the cemented surface of each cemented lens component at a location closer to the pupil or satisfy the following condition (8):

$$d_2/d_1 \leq 1 \tag{8}$$

When the condition (8) is satisfied, nearly no problem is posed by the curvature of coma.

Even when the condition (8) is satisfied, astigmatic difference is produced also in an amount smaller than that of the astigmatism produced in the conventional image transmitting optical system so far as each bar-shaped lens element has sufficient thickness.

Bar-shaped lens elements such as those which are to be used in the image transmitting optical system according to the present invention generally require delicate technique for shaping and are manufactured at high cost. This manufacturing cost can be lowered by dividing each of the lens elements into a plurality of pieces, shaping these pieces separately and then forming each of the lens elements by cementing these pieces. It is also desirable for lowering the manufacturing cost to adopt a glass material or a plastic material which can be formed into the bar-shaped lens elements by the press technique in which remarkable progress has been made in recent years.

When the bar-shaped lens elements formed by the press technique are to be used, it is possible to correct aberrations in the image transmitting optical system by forming aspherical surfaces on the bar-shaped lens elements. For example, coma can be corrected together with astigmatism and spherical aberration by using aspherical surfaces on the sides of the images.

DETAILED DESCRIPTION OF THE PREFERRED EMBODIMENTS

Figure 1:
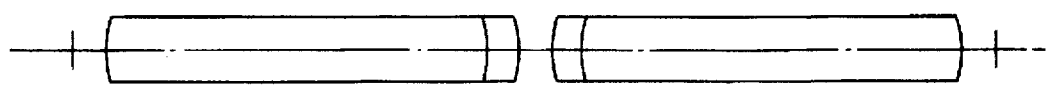
FIG. 1 through FIG. 3 show sectional views illustrating the compositions of the conventional image transmitting optical systems.
Figure 2:
Figure 3:
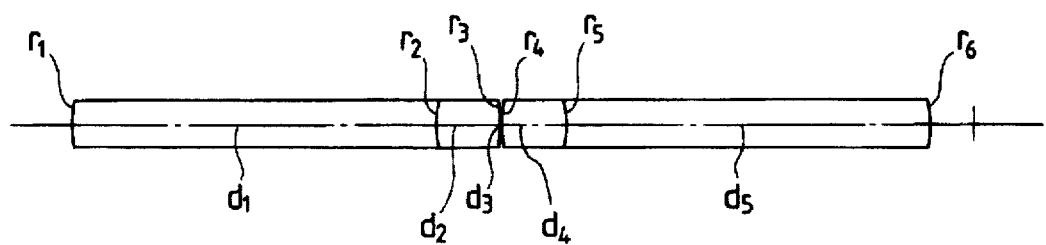
Figure 4:
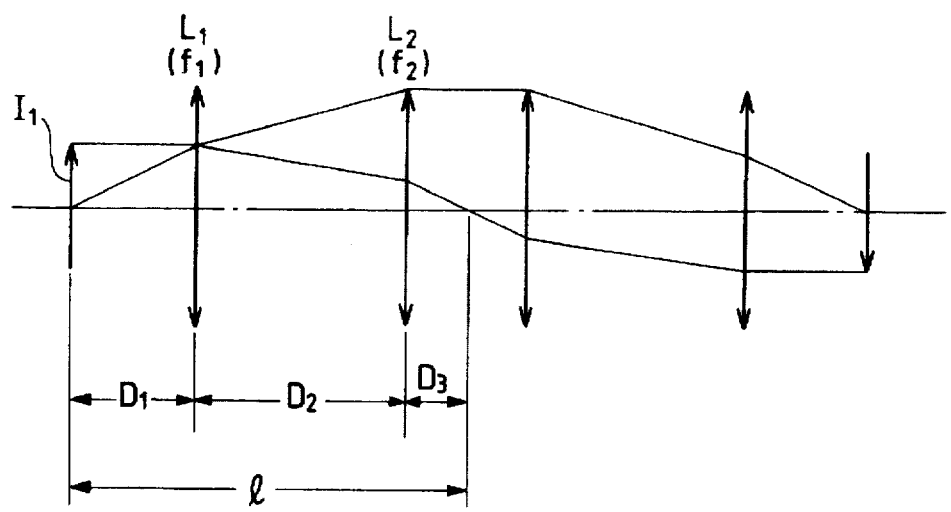
FIG. 4 through FIG. 8 show diagrams descriptive of the functional principle of the image transmitting optical system according to the present invention.
Figure 5:
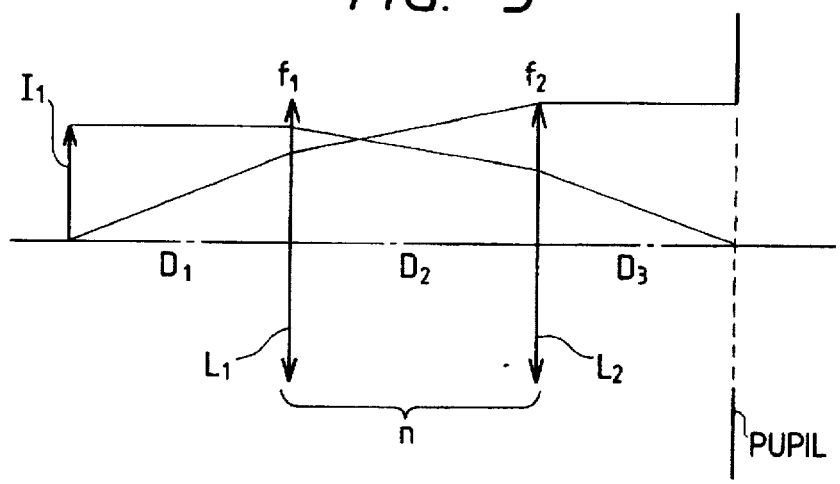
Figure 6:
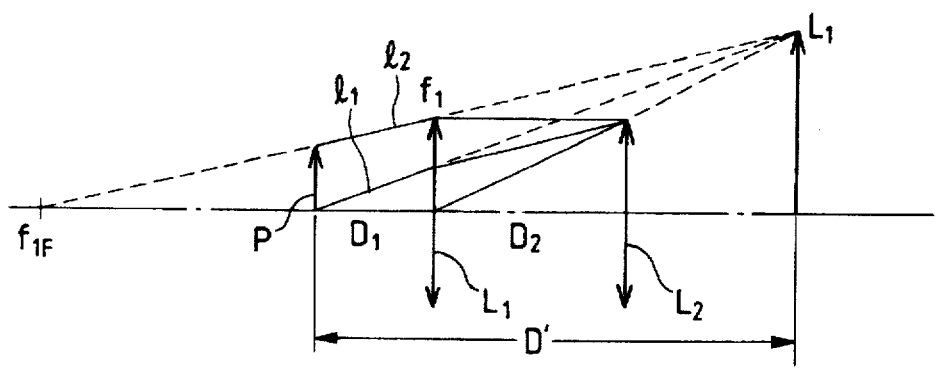
Figure 7:
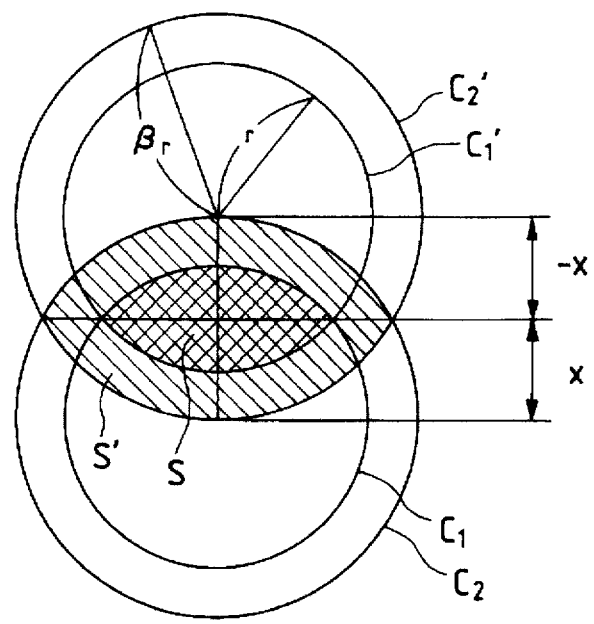
Figure 8:
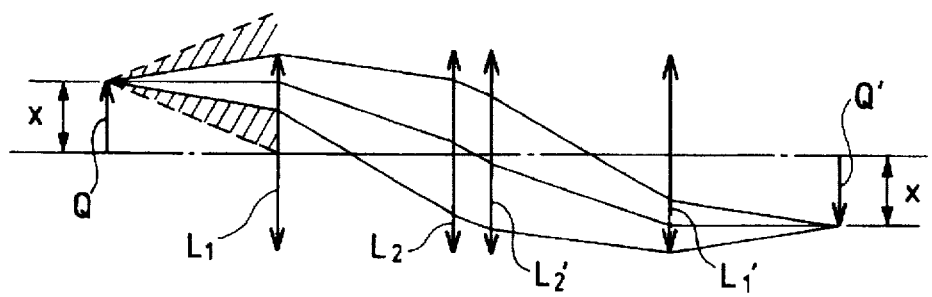

Now, the image transmitting optical system according to the present invention will be described more detailedly below with reference to the preferred embodiments illustrated in the accompanying drawings and given in the form of the numerical data shown below:

Embodiment 1

$r_1 = 15.0247$
  $d_1 = 39.0000$   $n_1 = 1.51633$   $v_1 = 64.15$
$r_2 = -7.8640$
  $d_2 = 1.0000$   $n_2 = 1.60717$   $v_2 = 40.26$
$r_3 = -15.7627$
  $d_3 = 5.0000$
$r_4 = 15.7627$
  $d_4 = 1.0000$   $n_3 = 1.60717$   $v_3 = 40.26$

-continued $r_5 = 7.8640$
$d_5 = 39.0000$  $n_4 = 1.51633$  $\nu_4 = 64.15$
$r_6 = -15.0247$
$D_1 = 7.5000,$  $D_3 = 2.5000$
$n = (n_1 d_1 + n_2 d_2)/(d_1 + d_2) = 1.5186$
$I = 3.582 \ (k = 0.8)$ Embodiment 2

$r_1 = 12.4151$
$d_1 = 31.5000$  $n_1 = 1.51633$  $\nu_1 = 64.15$
$r_2 = -6.9712$
$d_2 = 1.0000$  $n_2 = 1.66755$  $\nu_2 = 41.93$
$r_3 = -17.8846$
$d_3 = 5.0000$
$r_4 = 17.8846$
$d_4 = 1.0000$  $n_3 = 1.66755$  $\nu_3 = 41.93$
$r_5 = 6.9712$
$d_5 = 31.5000$  $n_4 = 1.51633$  $\nu_4 = 64.15$
$r_6 = -12.4151$
$D_1 = 15.0000,$  $D_3 = 2.5000$
$n = 1.52098,$  $I = 3.437 \ (k = 0.8)$

Embodiment 3

$r_1 = 14.1181$
$d_1 = 36.0000$  $n_1 = 1.51633$  $\nu_1 = 64.15$
$r_2 = -8.0615$
$d_2 = 1.5000$  $n_2 = 1.65016$  $\nu_2 = 39.39$
$r_3 = -16.1032$
$d_3 = 5.0000$
$r_4 = 16.1032$
$d_4 = 1.5000$  $n_3 = 1.65016$  $\nu_3 = 39.39$
$r_5 = 8.0615$
$d_5 = 36.0000$  $n_4 = 1.51633$  $\nu_4 = 64.15$
$r_6 = -14.1181$
$D_1 = 10.0000,$  $D_2 = 2.5000$
$n = 1.52168,$  $I = 3.883 \ (k = 0.8)$

Embodiment 4

$r_1 = 15.7643$
$d_1 = 36.5000$  $n_1 = 1.62004$  $\nu_1 = 36.25$
$r_2 = 11.0094$
$d_2 = 2.0000$  $n_2 = 1.54739$  $\nu_2 = 53.55$
$r_3 = -17.6908$
$d_3 = 3.0000$
$r_4 = 17.6908$
$d_4 = 2.0000$  $n_3 = 1.54739$  $\nu_3 = 53.55$
$r_5 = -11.0094$
$d_5 = 36.5000$  $n_4 = 1.62004$  $\nu_4 = 36.25$
$r_6 = -15.7643$
$D_1 = 10.0000,$  $D_3 = 1.5000$
$n = 1.61627,$  $I = 4.303 \ (k = 0.8)$

Embodiment 5

$r_1 = 15.4074$ (aspherical surface)
$d_1 = 36.5000$  $n_1 = 1.62004$  $\nu_1 = 36.25$
$r_2 = 11.6157$
$d_2 = 2.0000$  $n_2 = 1.54739$  $\nu_2 = 53.55$
$r_3 = -17.9630$
$d_3 = 3.0000$
$r_4 = 17.9630$
$d_4 = 2.0000$  $n_3 = 1.54739$  $\nu_3 = 53.55$
$r_5 = -11.6157$
$d_5 = 36.5000$  $n_4 = 1.62004$  $\nu_4 = 36.25$
$r_6 = -15.4074$ (aspherical surface)
aspherical surface coefficient
(1st surface)  $P = 1.0000$
$E = -0.94522 \times 10^{-4},$  $F = 0.40116 \times 10^{-7}$
(6th surface)  $P = 1.0000$
$E = 0.94522 \times 10^{-4},$  $F = -0.40116 \times 10^{-7}$
$D_1 = 10.0000,$  $D_3 = 1.5000$
$n = 1.61627,$  $I = 4.303 \ (k = 0.8)$ Embodiment 6

$r_1 = 14.4681$
$d_1 = 31.0000$  $n_1 = 1.51633$  $\nu_1 = 64.15$
$r_2 = -7.3443$
$d_2 = 4.0000$  $n_2 = 1.66466$  $\nu_2 = 35.81$
$r_3 = -15.4535$
$d_3 = -10.0000$

-continued $r_4 = 15.4535$
$d_4 = 4.0000$  $n_3 = 1.66446$  $\nu_3 = 35.81$
$r_5 = 7.3443$
$d_5 = 31.0000$  $n_4 = 1.51633$  $\nu_4 = 64.15$
$r_6 = -14.4681$
$D_1 = 10.0000,$  $D_3 = 5.0000$
$n = 1.53326,$  $I = 3.798 \ (k = 0.8)$ Embodiment 7

$r_1 = 22.9224$
$d_1 = 23.0000$  $n_1 = 1.51633$  $\nu_1 = 64.15$
$r_2 = -6.4417$
$d_2 = 2.0000$  $n_2 = 1.66446$  $\nu_2 = 35.81$
$r_3 = -12.1347$
$d_3 = 30.0000$
$r_4 = 12.1347$
$d_4 = 2.0000$  $n_3 = 1.66446$  $\nu_3 = 35.81$
$r_5 = 6.4417$
$d_5 = 23.0000$  $n_4 = 1.51633$  $\nu_4 = 64.15$
$r_6 = -22.9224$
$D_1 = 10.0000,$  $D_3 = 15.0000$
$n = 1.52818,$  $I = 2.746 \ (k = 0.8)$

Embodiment 8

$r_1 = 13.7535$
$d_1 = 3.0000$  $n_1 = 1.65016$  $\nu_1 = 39.39$
$r_2 = 6.9922$
$d_2 = 24.0000$  $n_2 = 1.51633$  $\nu_2 = 64.15$
$r_3 = -6.9922$
$d_3 = 3.0000$  $n_3 = 1.65016$  $\nu_3 = 39.39$
$r_4 = -13.7535$
$d_4 = 20.0000$
$r_5 = 13.7535$
$d_5 = 3.0000$  $n_4 = 1.65016$  $\nu_4 = 39.39$
$r_6 = 6.9922$
$d_6 = 24.0000$  $n_5 = 1.51633$  $\nu_5 = 64.15$
$r_7 = -6.9922$
$d_7 = 3.0000$  $n_6 = 1.65016$  $\nu_6 = 39.39$
$r_8 = -13.7535$
$D_1 = 10.0000,$  $D_3 = 10.0000$
$n = 1.543,$  $I = 3.416 \ (k = 0.8)$

Embodiment 9

$r_1 = 17.7309$
$d_1 = 44.9599$  $n_1 = 1.57260$  $\nu_1 = 57.80$
$r_2 = -8.3018$
$d_2 = 0.8302$  $n_2 = 1.62558$  $\nu_2 = 35.70$
$r_3 = -16.6533$
$d_3 = 3.3838$
$r_4 = 16.6533$
$d_4 = 0.8302$  $n_3 = 1.62558$  $\nu_3 = 35.70$
$r_5 = 8.3018$
$d_5 = 44.9599$  $n_4 = 1.57260$  $\nu_4 = 57.80$
$r_6 = -17.7309$
$D_1 = 2.5180,$  $D_3 = 1.6919$
$n = 1.57356,$  $I = 2.822 \ (k = 0.8)$

Embodiment 10

F/7.467,  IH = 1.0000,  magnification −1.0000
$r_1 = 10.6403$
$d_1 = 13.9524$  $n_1 = 1.63980$  $\nu_1 = 34.48$
$r_2 = 3.32237$
$d_2 = 13.7976$  $n_2 = 1.56883$  $\nu_2 = 56.34$
$r_3 = -9.7246$
$d_3 = 2.0000$
$r_4 = 9.7246$
$d_4 = 13.7976$  $n_3 = 1.56883$  $\nu_3 = 56.34$
$r_5 = -3.2237$
$d_5 = 13.9524$  $n_4 = 1.63980$  $\nu_4 = 34.48$
$r_6 = -10.6403$
$d_2/d_1 = 0.99$ Embodiment 11

F/6.703,  IH = 1.0000,  magnification −1.0000
$r_1 = 9.0564$
$d_1 = 8.4433$  $n_1 = 1.63980$  $\nu_1 = 34.48$
$r_2 = 2.9745$
$d_2 = 16.3067$  $n_2 = 1.56883$  $\nu_2 = 56.34$
$r_3 = -11.1315$
$d_3 = 2.0000$ -continued

```
r₄ = 11.1315
    d₄ = 16.3067    n₃ = 1.56883    ν₃ = 56.34
r₅ = -2.9745
    d₅ = 8.4433     n₄ = 1.63980    ν₄ = 34.48
r₆ = -9.0564
    d₂/d₁ = 1.93
Embodiment 12
```

F/6.566, IH = 1.0000, magnification -1.0000
```
r₁ = 9.7840
    d₁ = 12.4200    n₁ = 1.63980    ν₁ = 34.48
r₂ = 4.0000
    d₂ = 12.3300    n₂ = 1.56883    ν₂ = 56.34
r₃ = -10.8320
    d₃ = 2.0000
r₄ = 10.8320
    d₄ = 12.3300    n₃ = 1.56883    ν₃ = 56.34
r₅ = -4.0000
    d₅ = 12.4200    n₄ = 1.63980    ν₄ = 34.48
r₆ = -9.7840
    d₂/d₁ = 0.99
Embodiment 13
```

F/6.550, IH = 1.0000, magnification -1.0000
```
r₁ = 9.1159
    d₁ = 13.8248    n₁ = 1.58913    ν₁ = 60.97
r₂ = -2.7561
    d₂ = 10.9252    n₂ = 1.63980    ν₂ = 34.48
r₃ = -11.8028
    d₃ = 2.0000
r₄ = 11.8028
    d₄ = 10.9252    n₃ = 1.63980    ν₃ = 34.48
r₅ = 2.7561
    d₅ = 13.8248    n₄ = 1.58913    ν₄ = 60.97
r₆ = -9.1159
    d₂/d₁ = 0.79
Embodiment 14
```

F/6.577, IH = 1.0000
```
r₁ = ∞
    d₁ = 0.3000     n₁ = 1.51633    ν₁ = 64.15
r₂ = ∞
    d₂ = 0.2000
r₃ = ∞
    d₃ = 0.2000     n₂ = 1.78800    ν₂ = 47.38
r₄ = 0.6020
    d₄ = 0.2500
r₅ = ∞
    d₅ = 1.2312     n₃ = 1.78800    ν₃ = 47.38
r₆ = ∞ (stop)
    d₆ = 2.6688     n₄ = 1.78800    ν₄ = 47.38
r₇ = -1.9990
    d₇ = 0.8300
r₈ = 7.3520
    d₈ = 1.8000     n₅ = 1.62280    ν₅ = 57.06
r₉ = -1.6080
    d₉ = 0.5000     n₆ = 1.84666    ν₆ = 23.78
r₁₀ = -3.7710
    d₁₀ = 1.3100
r₁₁ = -1.4230
    d₁₁ = 0.5100    n₇ = 1.72825    ν₇ = 28.46
r₁₂ = ∞
    d₁₂ = 2.2600    n₈ = 1.78800    ν₈ = 47.38
r₁₃ = -2.7420
    d₁₃ = 8.4700
r₁₄ = 9.7840
    d₁₄ = 12.4200   n₉ = 1.63980    ν₉ = 34.48
r₁₅ = 4.0000
    d₁₅ = 12.3300   n₁₀ = 1.56883   ν₁₀ = 56.34
r₁₆ = -10.8320
    d₁₆ = 2.0000
r₁₇ = 10.8320
    d₁₇ = 12.3300   n₁₁ = 1.56883   ν₁₁ = 56.34
r₁₈ = -4.0000
    d₁₈ = 12.4200   n₁₂ = 1.63980   ν₁₂ = 34.48
r₁₉ = -9.7840
    d₁₉ = 9.0000
r₂₀ = 9.7840
    d₂₀ = 12.4200   n₁₃ = 1.63980   ν₁₃ = 34.48
```

-continued

```
r₂₁ = 4.0000
    d₂₁ = 12.3300   n₁₄ = 1.56883   ν₁₄ = 56.34
r₂₂ = -10.8320
    d₂₂ = 2.0000
r₂₃ = 10.8320
    d₂₃ = 12.3300   n₁₅ = 1.56883   ν₁₅ = 56.34
r₂₄ = -4.0000
    d₂₄ = 12.4200   n₁₆ = 1.63980   ν₁₆ = 34.48
r₂₅ = -9.7840
    d₂₅ = 9.0000
r₂₆ = 9.7840
    d₂₆ = 12.4200   n₁₇ = 1.63980   ν₁₇ = 34.48
r₂₇ = 4.0000
    d₂₇ = 12.3300   n₁₈ = 1.56883   ν₁₈ = 56.34
r₂₈ = -10.8320
    d₂₈ = 2.0000
r₂₉ = 10.8320
    d₂₉ = 12.3300   n₁₉ = 1.56883   ν₁₉ = 56.34
r₃₀ = -4.0000
    d₃₀ = 12.4200   n₂₀ = 1.63980   ν₂₀ = 34.48
r₃₁ = -9.7840
    d₃₁ = 9.0000
r₃₂ = 9.7840
    d₃₂ = 12.4200   n₂₁ = 1.63980   ν₂₁ = 34.48
r₃₃ = 4.0000
    d₃₃ = 12.3300   n₂₂ = 1.56883   ν₂₂ = 56.34
r₃₄ = -10.8320
    d₃₄ = 2.0000
r₃₅ = 10.8320
    d₃₅ = 12.3300   n₂₃ = 1.56883   ν₂₃ = 56.34
r₃₆ = -4.0000
    d₃₆ = 12.4200   n₂₄ = 1.63980   ν₂₄ = 34.48
r₃₇ = -9.7840
    d₃₇ = 9.0000
r₃₈ = 9.7840
    d₃₈ = 12.4200   n₂₅ = 1.63980   ν₂₅ = 34.48
r₃₉ = 4.0000
    d₃₉ = 12.3300   n₂₆ = 1.56883   ν₂₆ = 56.34
r₄₀ = -10.8320
    d₄₀ = 2.0000
r₄₁ = 10.8320
    d₄₁ = 12.3300   n₂₇ = 1.56883   ν₂₇ = 56.34
r₄₂ = -4.0000
    d₄₂ = 12.4200   n₂₈ = 1.63980   ν₂₈ = 34.48
r₄₃ = -9.7840
Embodiment 15
```

F/6.297, IH = 1.0000, magnification -1.0000
```
r₁ = 10.0088 (aspherical surface)
    d₁ = 17.2977    n₁ = 1.63980    ν₁ = 34.48
r₂ = 5.5905
    d₂ = 7.4523     n₂ = 1.57135    ν₂ = 52.92
r₃ = -10.6967
    d₃ = 2.0000
r₄ = 10.6967
    d₄ = 7.4523     n₃ = 1.57135    ν₃ = 52.92
r₅ = -5.5905
    d₅ = 17.2977    n₄ = 1.63980    ν₄ = 34.48
r₆ = -10.0088 (aspherical surface)
aspherical surface coefficient
    (1st surface)  P = 1.0000,   E = -0.55339 × 10⁻³
    (6th surface)  P = 1.0000,   E = 0.55339 × 10⁻³
    d₂/d₁ = 0.43
```

Figure 9:
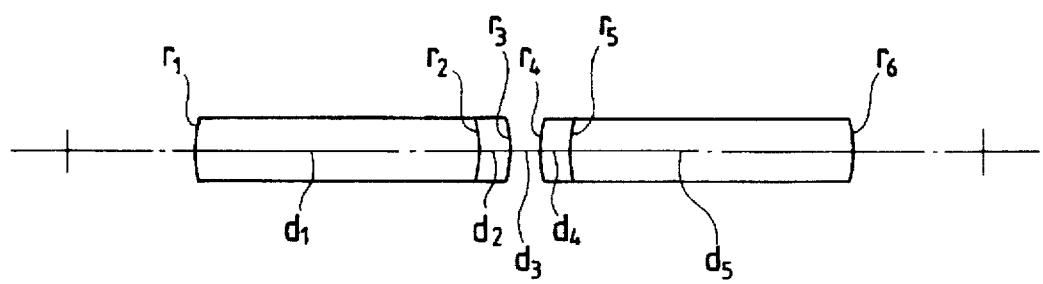
FIG. 9 shows a sectional view illustrating composition of first through seventh and ninth embodiments of the image transmitting optical system according to the present invention.
Figure 10:
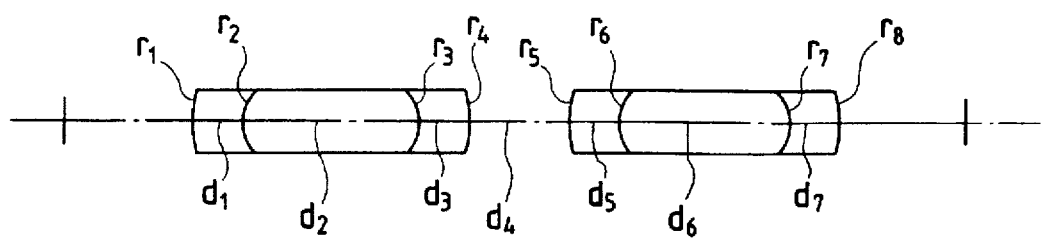
FIG. 10 shows a sectional view illustrating composition of eighth embodiment of the image transmitting optical system according to the present invention.
Figure 11:
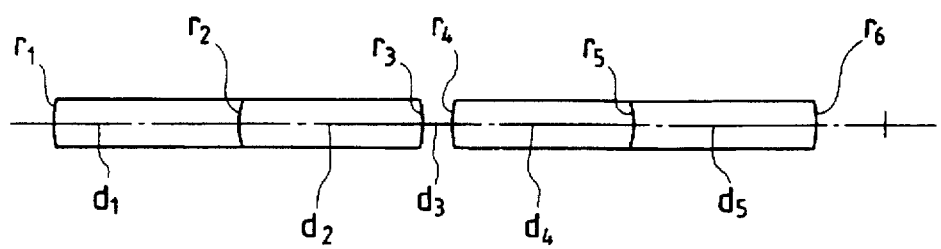
FIG. 11 shows a sectional view illustrating composition of tenth through twelfth, fourteenth and fifteenth embodiments of the image transmitting optical system according to the present invention.

The first through seventh and ninth embodiments have the composition illustrated in FIG. 9, and the eighth embodiment has the composition shown in FIG. 10, whereas the tenth through twelfth, fourteen and fifteenth embodiments have the composition illustrated in FIG. 11. The thirteenth embodiment has the composition shown in FIG. 12.

The first embodiment is an example wherein the vignetting factor (ratio of light quantity allowed to transmit through the image transmitting optical system) is enhanced to provide brightness at the marginal portion of the image surface as high as 70% of that at the center of the image surface. In the first embodiment, spherical aberration and chromatic aberration are corrected by using the bar-shaped cemented lens components. Since the image transmitting optical system preferred as the first embodiment has the high aperture efficiency, it provides an image which is bright over the entire range from the center to the marginal portion of a visual field.

The second embodiment is an example wherein the ratio of total light quantity allowed to transmit through the image transmitting optical system is enhanced by increasing the quantity of light to reach the center of the image surface. The image transmitting optical system preferred as the second embodiment provides an image having a bright central portion. Further, spherical aberration and chromatic aberration are corrected favorably in the second embodiment by using the bar-shaped cemented lens components.

The third embodiment is an example in which the ratio of light quantity allowed to transmit therethrough is nearly optimized. Since the image transmitting optical system preferred as the third embodiment allows light to transmit therethrough in a quantity tens of percent larger than that of the light allowed to transmit through the conventional image transmitting optical system, the third embodiment makes it possible to observe a sufficiently bright image of a location which is too dark for observation through the conventional image transmitting optical system.

The fourth embodiment provides, like the third embodiment, a very bright image. In the fourth embodiments, the bar-shaped lens elements of the bar-shaped lens components are made of a glass material which has high refractive index and a high dispersing power for correcting spherical aberration and chromatic aberration, unlike the bar-shaped lens elements adopted for the first through third embodiments.

The fifth embodiment has the composition which is substantially the same as that of the fourth embodiment and uses an aspherical surface as the image side surface of each bar-shaped cemented lens component. That is to say, the fifth embodiment is preferred as an example which is constructed to increase quantity of light allowed to transmit through the image transmitting optical system and correct astigmatism by the aspherical surfaces in addition to spherical aberration and chromatic aberration.

Each of the sixth, seventh and ninth embodiments are examples wherein a widened space is reserved between the two bar-shaped cemented lens components composing a single relay lens unit. For lessening the influence due to misalignment of a spacing ring or to obtain a favorable image, it is desirable to reserve a widened space between the two bar-shaped cemented lens components.

In the eighth embodiment which has the composition illustrated in FIG. 10, a relay lens unit is composed of two lens components, each of which is symmetrical with regard to the center thereof in the horizontal direction. When the image transmitting optical system is to comprise a plurality of relay lens units, it is sufficient for the eighth embodiment to use only one kind of spacing rings and it is unnecessary for the eighth embodiment to consider directions of the bar-shaped lens components since the space to be reserved between two adjucent relay lens units arranged on both sides of the image is equal to the spacing reserved between the two bar-shaped lens components with the pupil interposed. Therefore, the eighth embodiment is effective for facilitating assembly of the image transmitting optical system or for preventing erroneous assembly.

Each of the tenth through fifteenth embodiments are constructed to correct spherical aberration and chromatic aberration by using the bar-shaped cemented lens components composed of bar-shaped lens elements, and to produce astigmatic difference which can easily be corrected with an objective lens system.

The tenth embodiment has the composition illustrated in FIG. 11 wherein spherical aberration and astigmatic difference are corrected favorably.

The eleventh embodiment adopts the same composition as that of the tenth embodiment, has favorably corrected spherical aberration and astigmatic difference, and reserves a space between the image of object and the lens surface adjacent thereto which is equal to 7.5% of the length of a single relay lens unit for preventing dust adhering to the lens surface from being visible during observation. Though the condition for preventing the dust adhering to the lens surface from being visible during observation is different dependently on an aperture size (F number) of the image transmitting optical system and a focal length of an eyepiece lens system to be adopted for observation, such dust is never visible so far as a space longer than 5% of the total length of a single relay lens unit is reserved between the image of object and the lens surface adjacent thereto.

In the eleventh embodiment wherein the space between the image of object and the lens surface adjacent thereto is wider than that adopted for the tenth embodiment, the first and sixth surfaces produce astigmatism more remarkably than that in the tenth embodiment, and the cemented surfaces having the negative refractive powers are arranged at locations lightly closer to the image surfaces. That is to say, the eleventh embodiment is an image transmitting optical system which is constructed to prevent observation of dust adhering to the lens surface adjacent to the image of object, and is free from spherical aberration and astigmatic difference.

The twelfth embodiment adopts a widened space between the image of the object and the lens surface adjacent thereto, like the eleventh embodiment, for preventing dust adhering to the lens surface from being observed.

Since the image transmitting optical system according to the present invention is composed of a small number of lens elements as described above, it is very difficult to correct all the aberrations completely in this optical system. In the eleventh embodiment, for example, coma is curved though slightly. When the image transmitting optical system comprises a plurality of relay lens units, curvature of coma is multiplied by the number of the relay lens units, thereby posing a problem of degradation in resolution. In order to reduce the curvature of coma, it is effective to arrange the cemented surfaces at locations which are not too close to the images for allowing a small quantity of astigmatic difference to remain in the image transmitting optical system and to correct the residual astigmatic difference with an objective lens system.

For this reason, it is desirable, for an image transmitting optical system comprising a large number of relay lens units, to reduce the curvature of coma even if the astigmatic difference of a small quantity remains as in the case of the twelfth embodiment.

Figure 12:
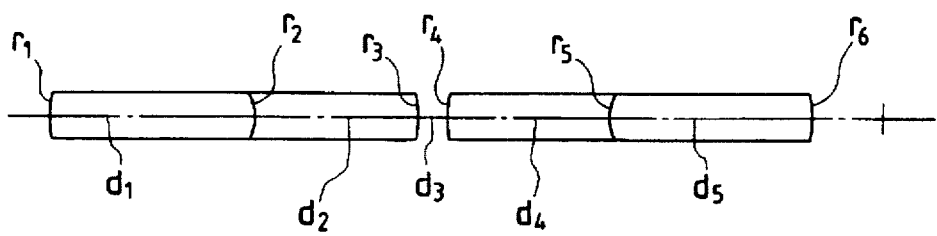
FIG. 12 shows a sectional view illustrating composition of thirteenth embodiment of the image transmitting optical system according to the present invention.

In the thirteenth embodiment having the composition illustrated in FIG. 12, the bar-shaped cemented lens components comprise cemented surfaces which are curved in the directions reserve to those of the cemented surfaces arranged in the image transmitting optical systems preferred as the tenth through twelfth embodiments. These directions of the cemented surfaces are selected since the relationship in refractive index between the image side lens element and the pupil side lens element in the thirteenth embodiment is reverse to that adopted for each of the tenth through twelfth embodiments, and the cemented surfaces curved in the reverse directions also have negative refractive powers and similarly contribute to correction of aberrations.

In each of the tenth through thirteenth embodiments, the lens element having the concave surface has a dispersing power higher than that of the other lens element in each bar-shaped cemented lens component, and dispersing powers of these two lens elements are selected at levels adequate for favorably correcting chromatic aberration.

Figure 13:
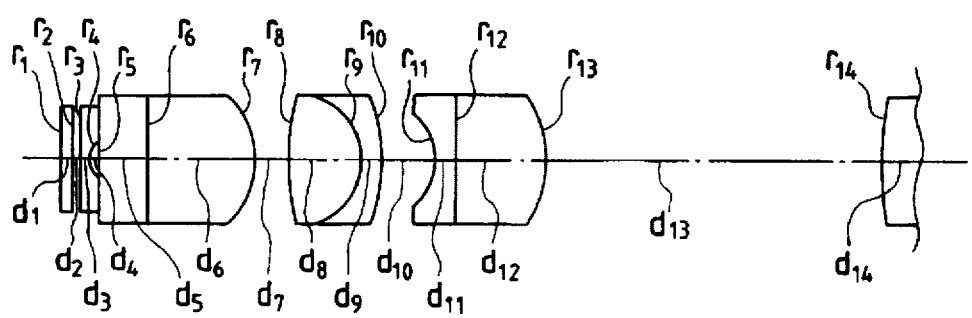
FIG. 13 shows a sectional view illustrating composition of an objective lens system for endoscopes which is to be used in combination with the image transmitting optical system according to the present invention.
Figure 14:
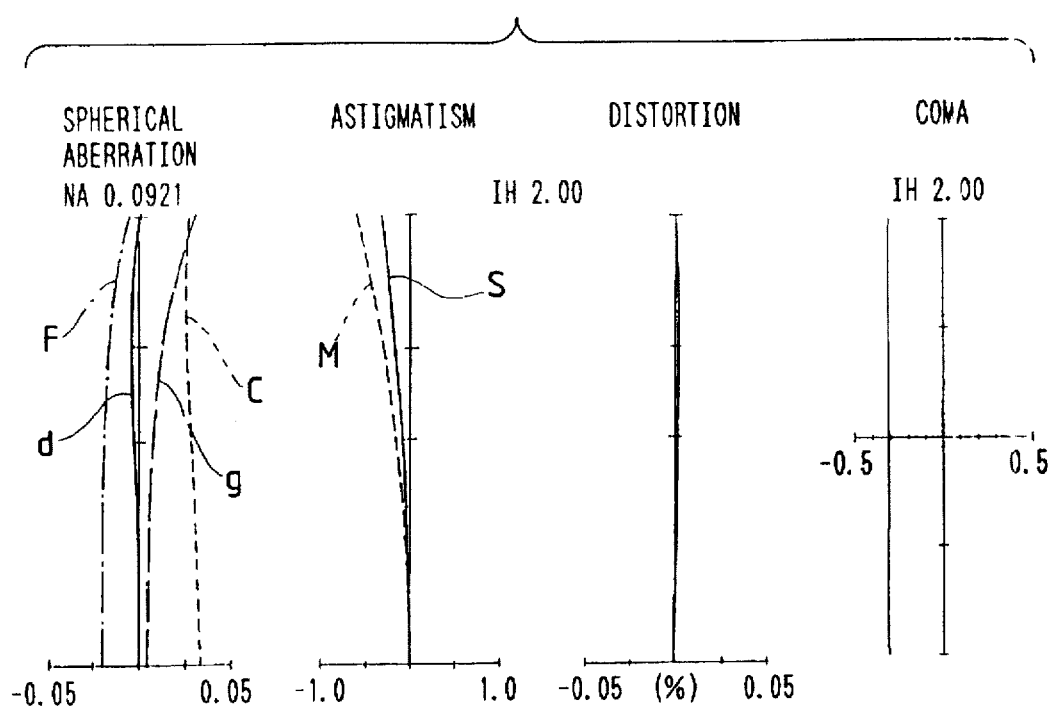
FIG. 14 through FIG. 28 show graphs illustrating aberration characteristics of the first through fifteenth embodiments of image transmitting optical system according to the present invention.
Figure 15:
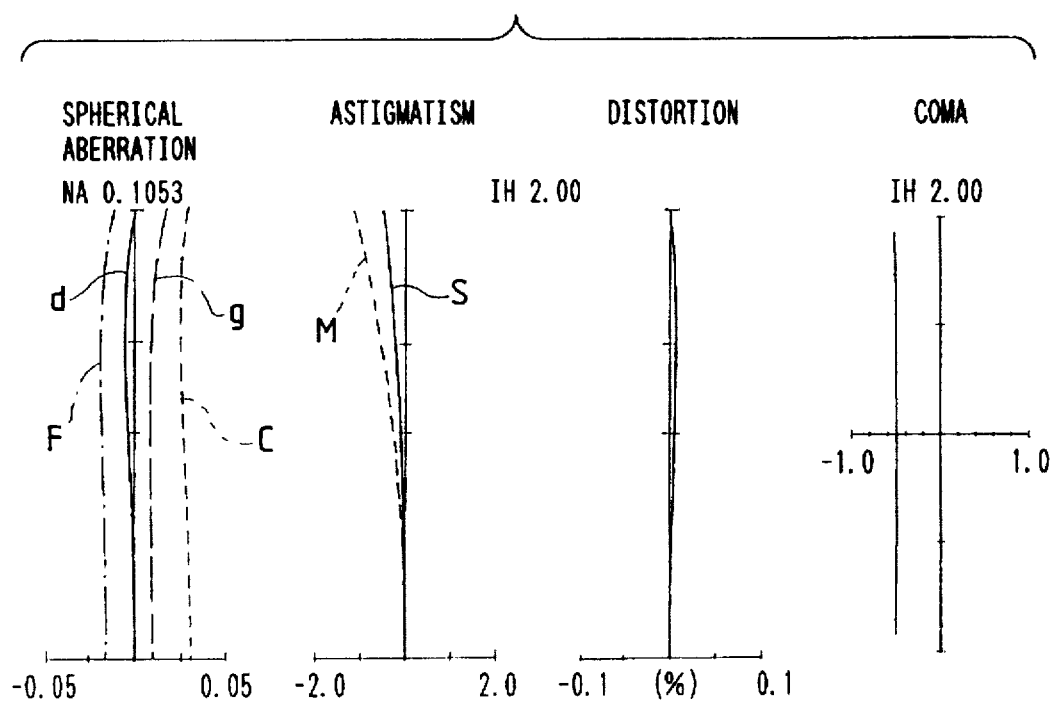
Figure 16:
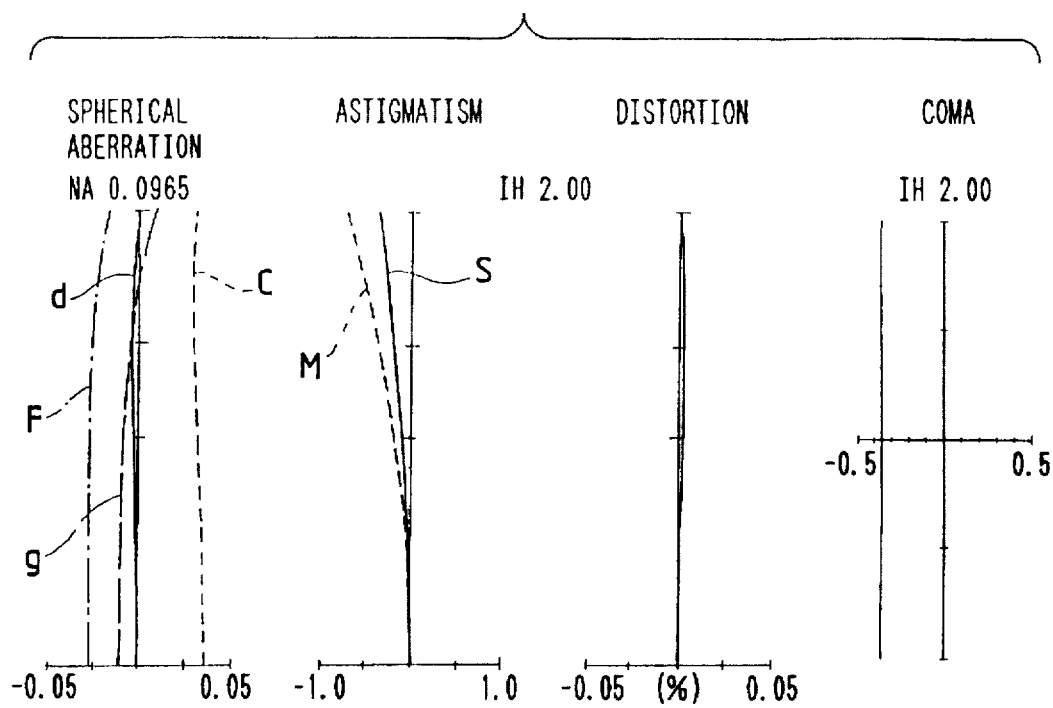
Figure 17:
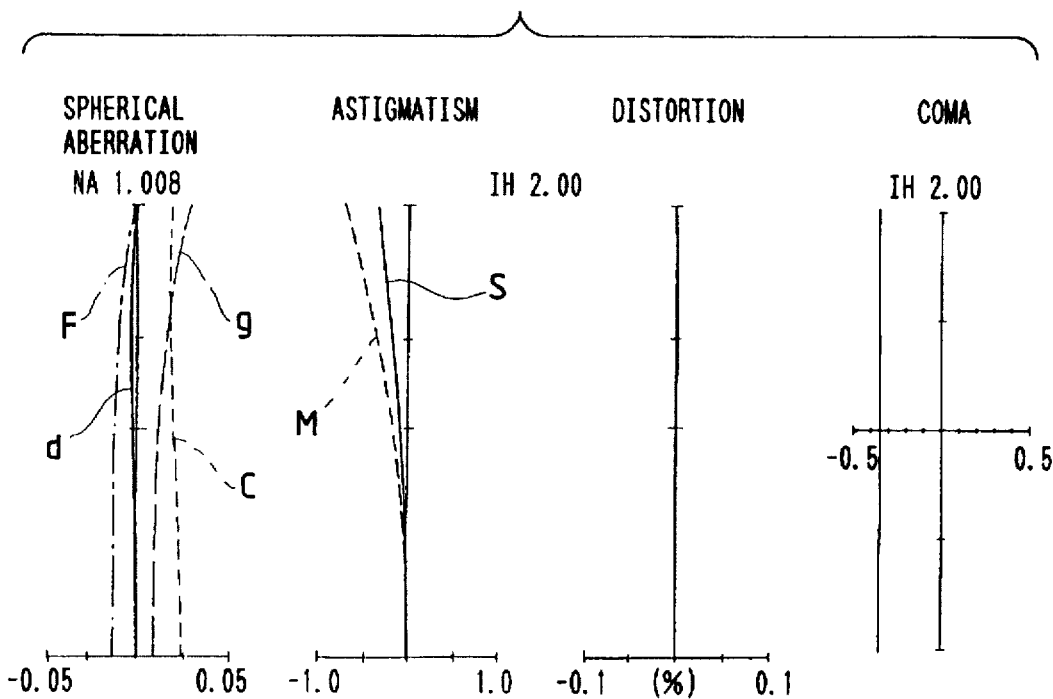
Figure 18:
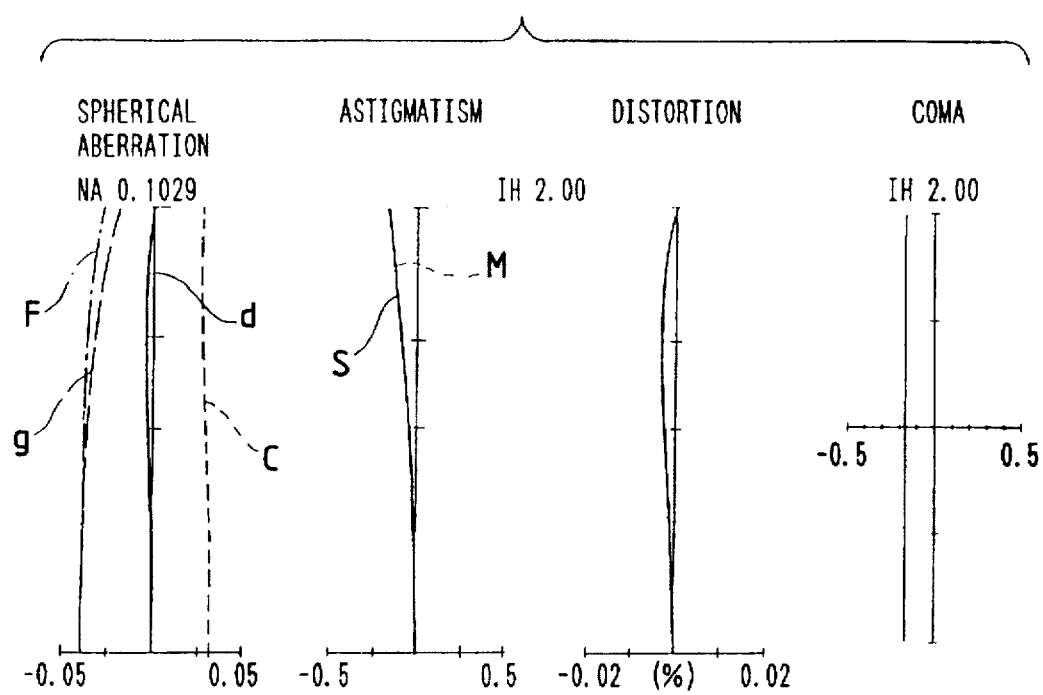
Figure 19:
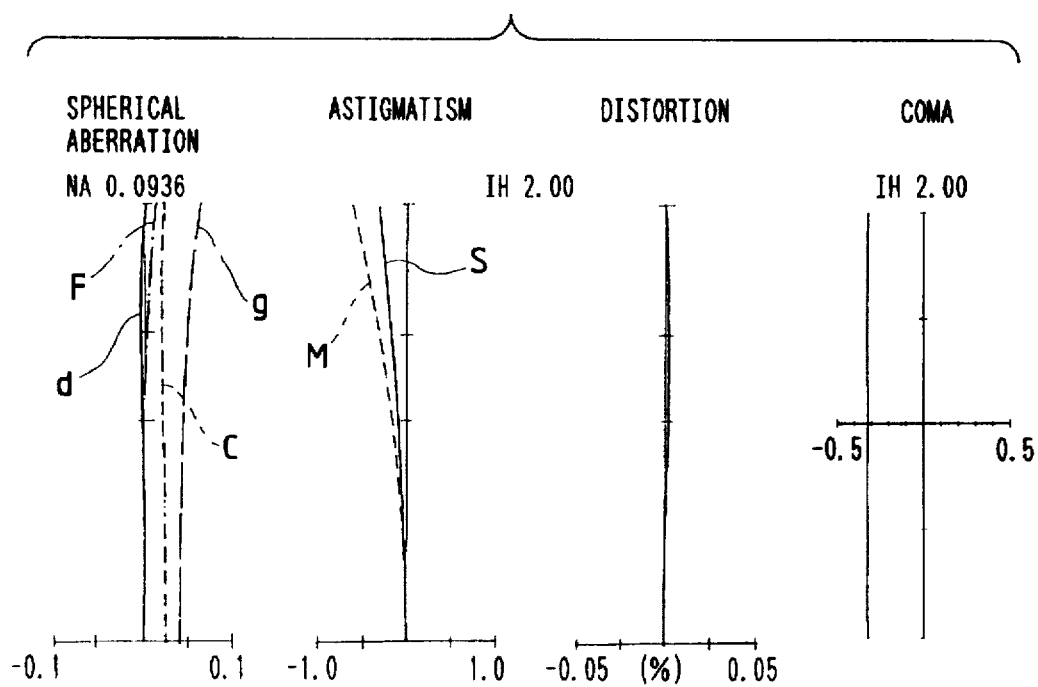
Figure 20:
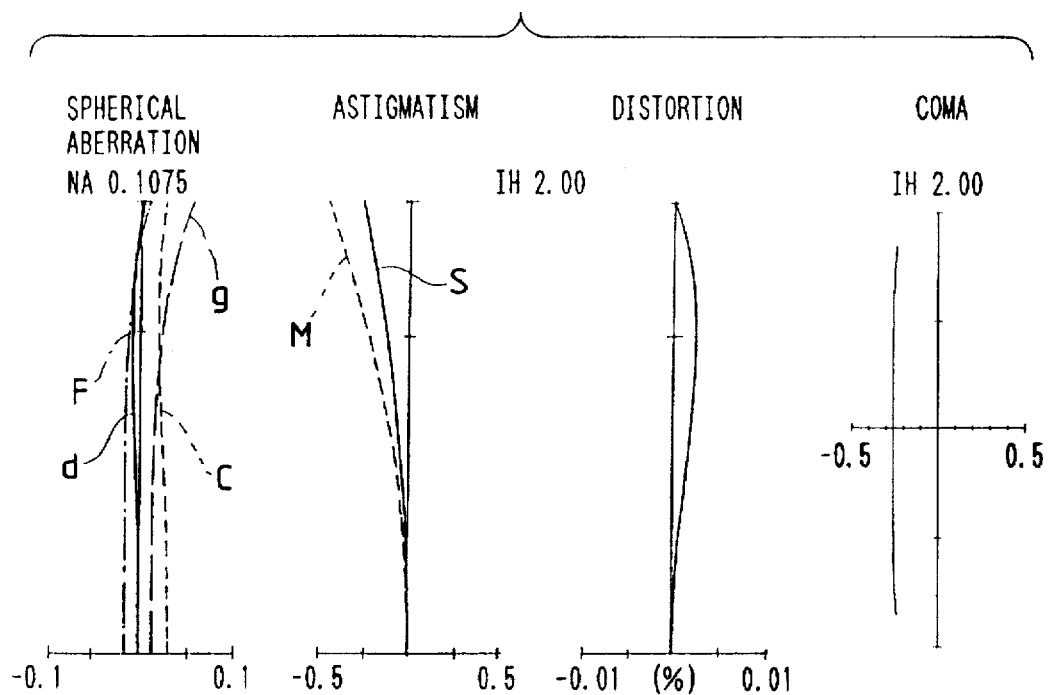
Figure 21:
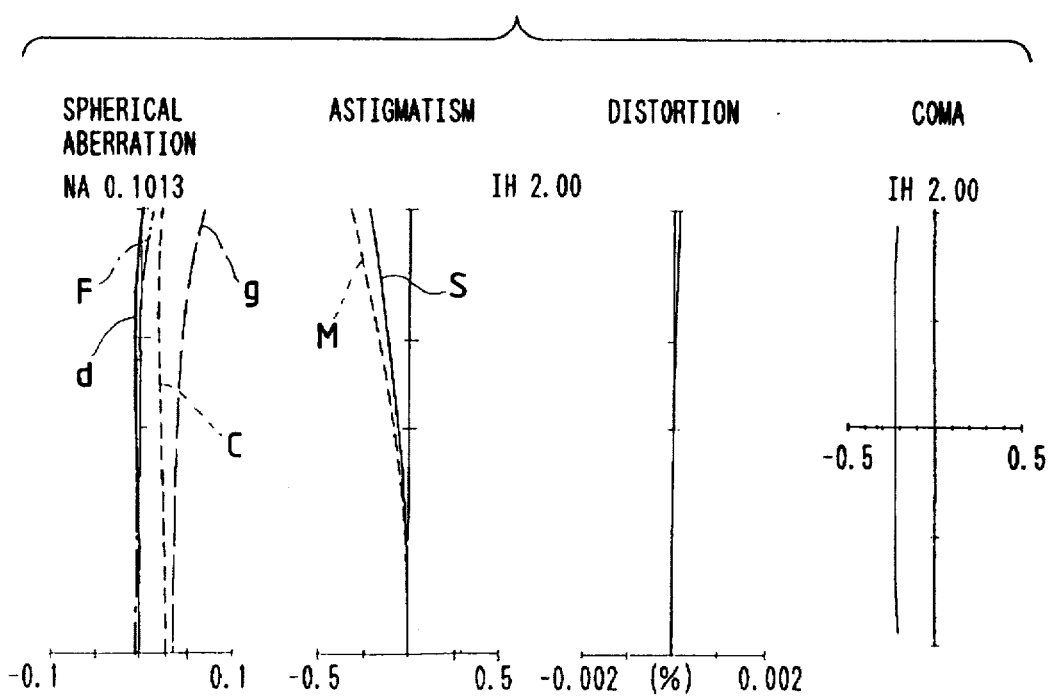
Figure 22:
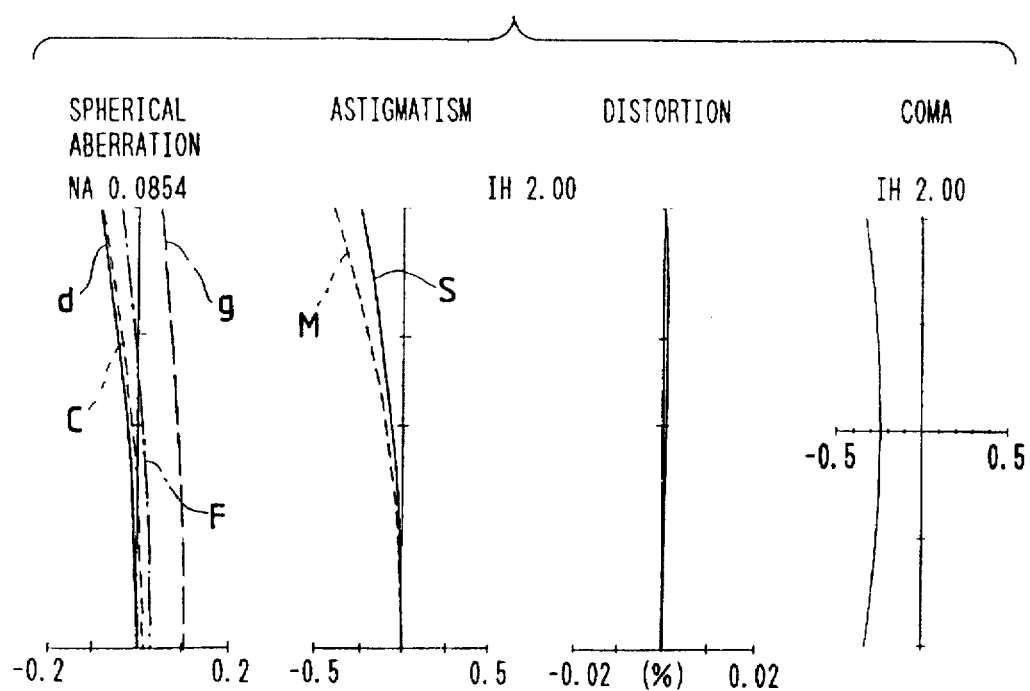
Figure 23:
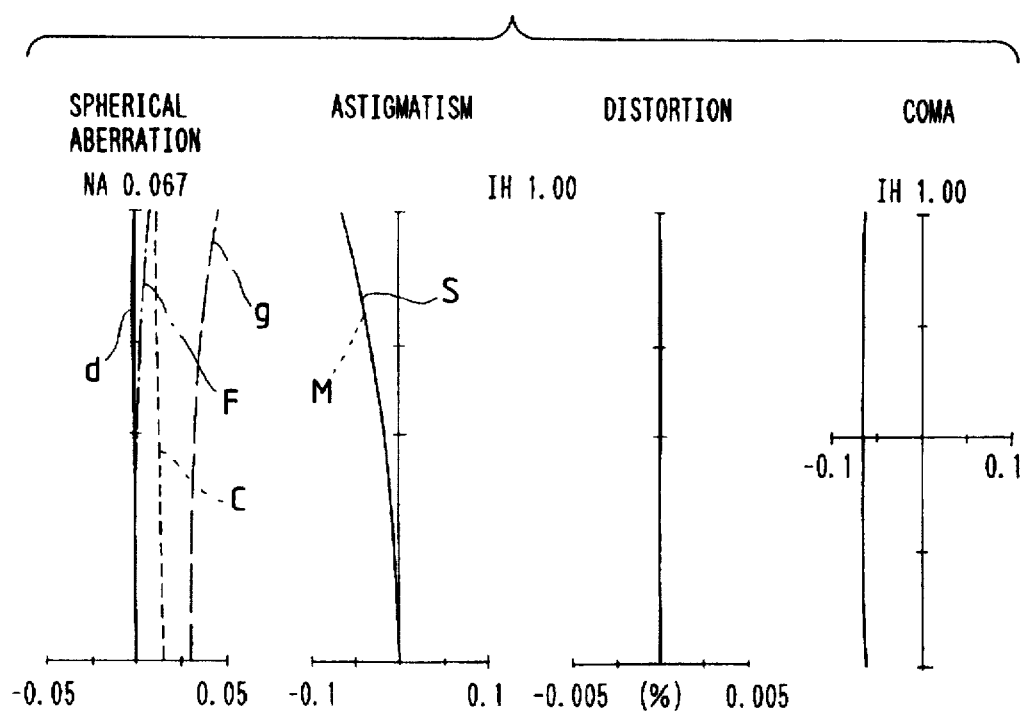
Figure 24:
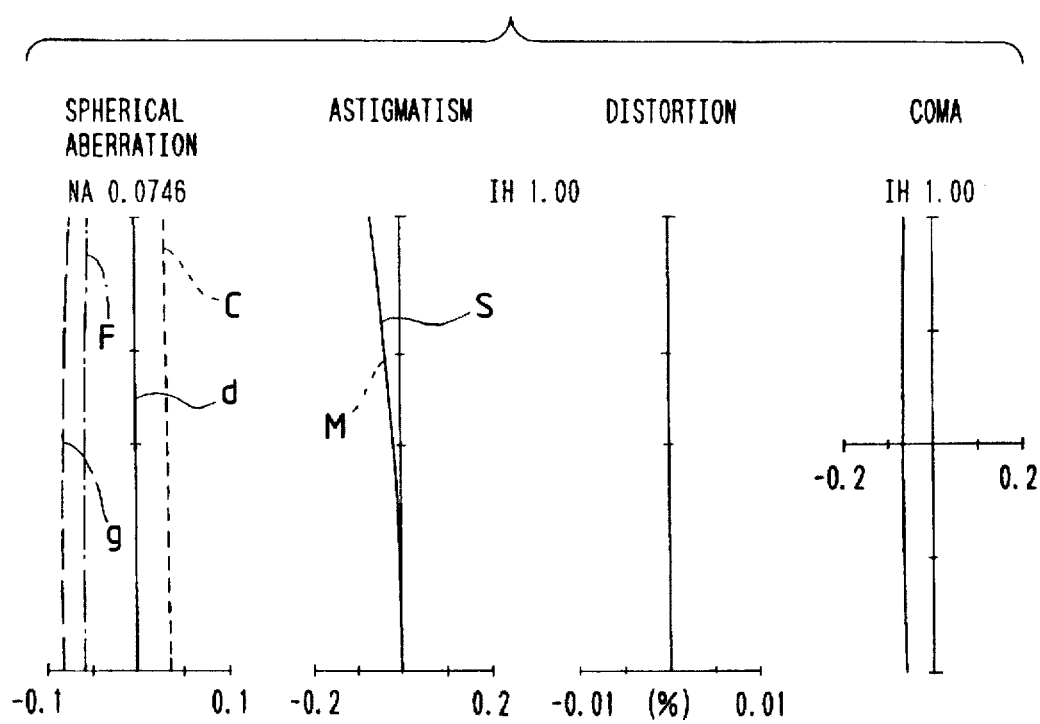
Figure 25:
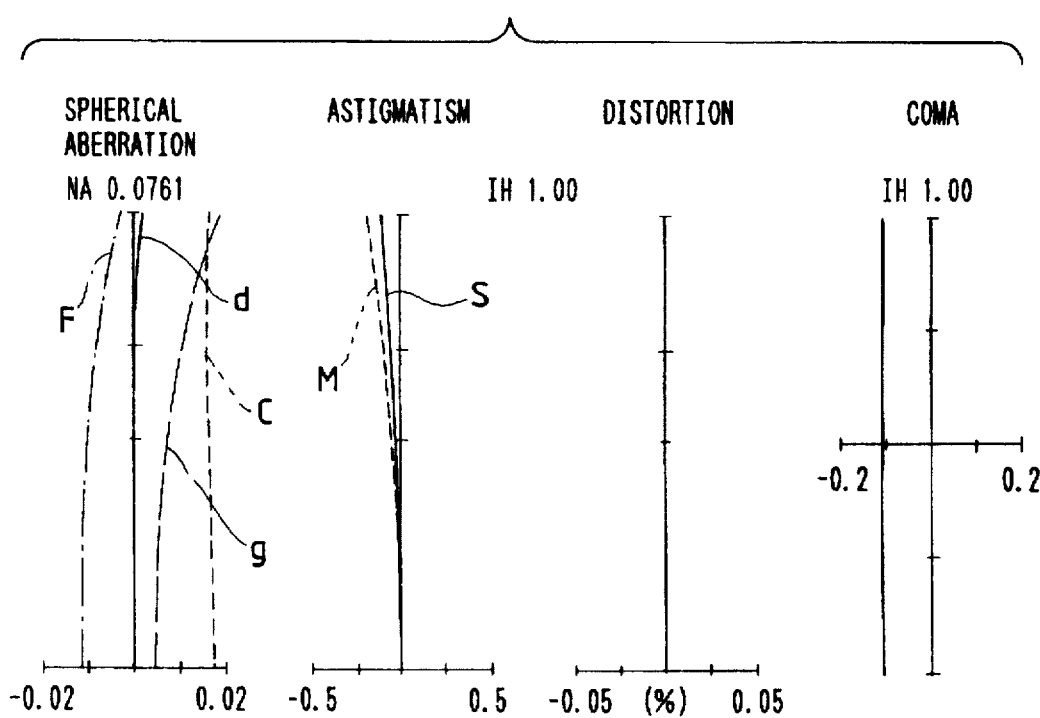
Figure 26:
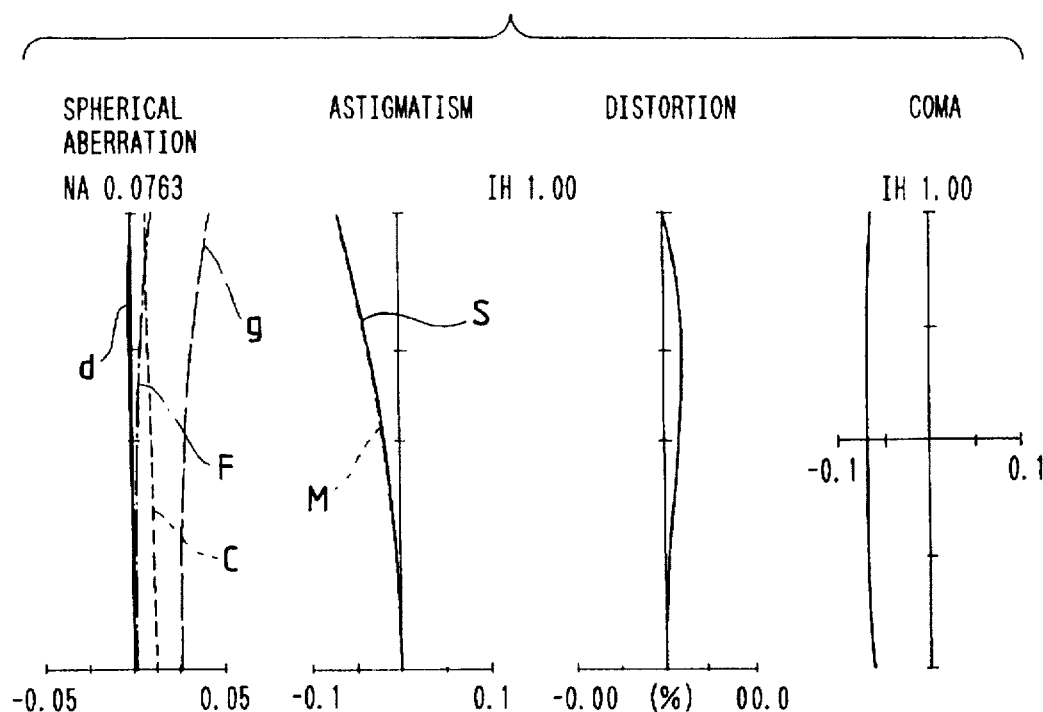
Figure 27:
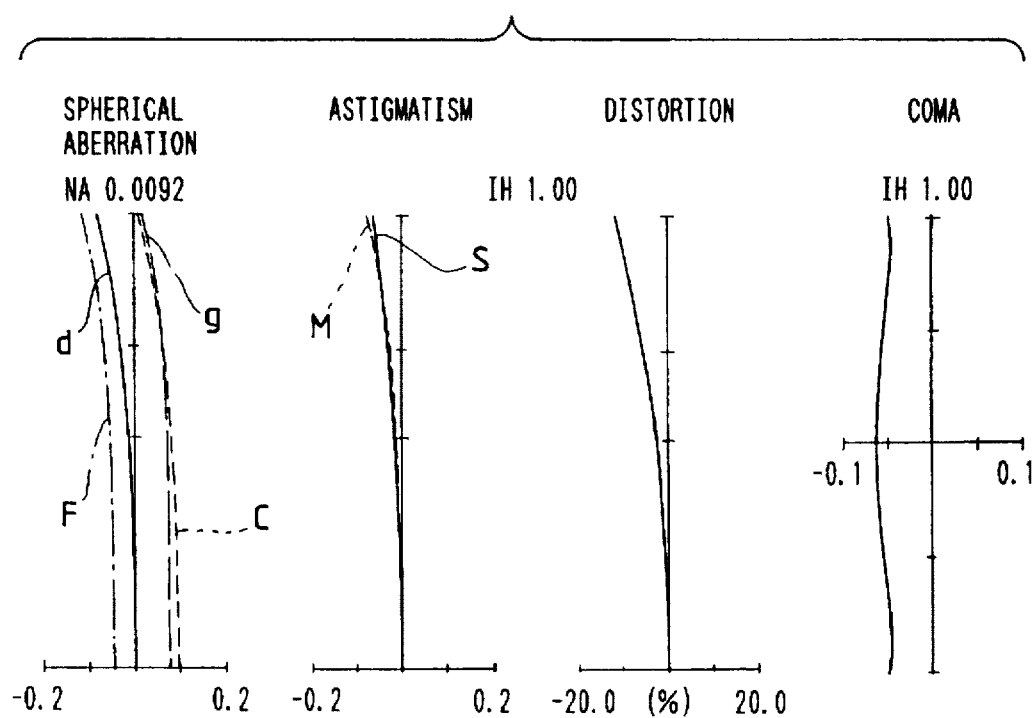
Figure 28:
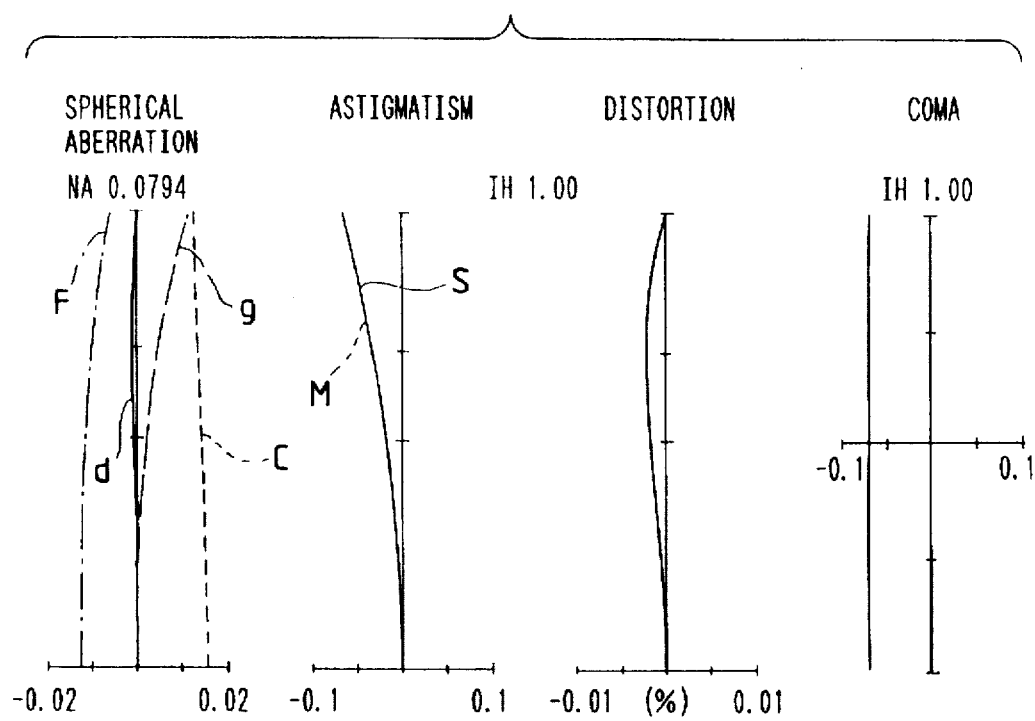
Figure 29:
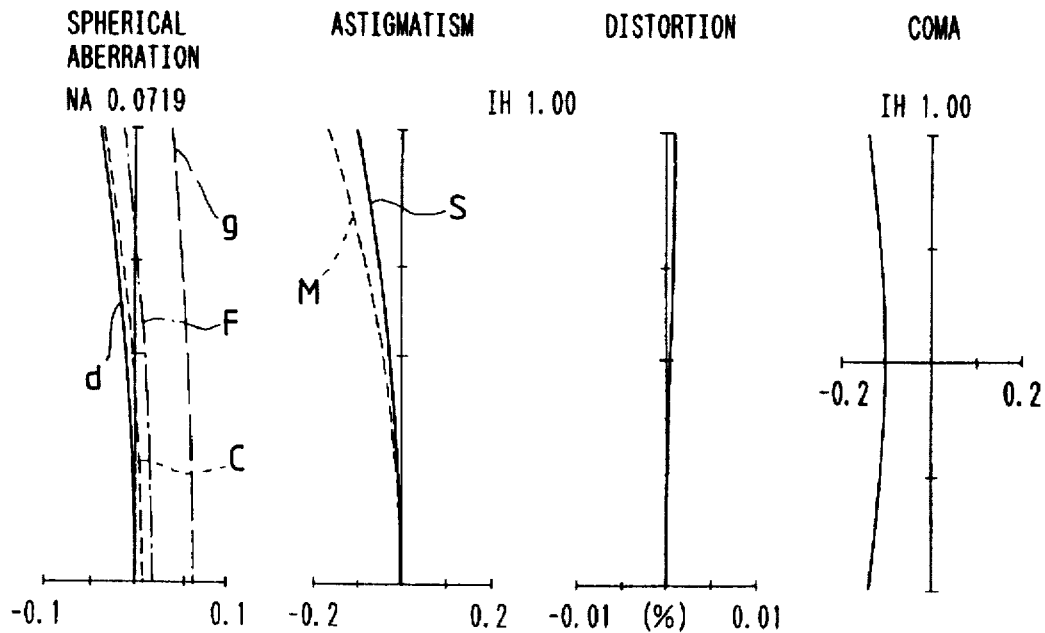
FIG. 29 and FIG. 30 show curves illustrating aberration characteristics of the conventional image transmitting optical systems shown in FIG. 1 and FIG. 3 respectively.
Figure 30:
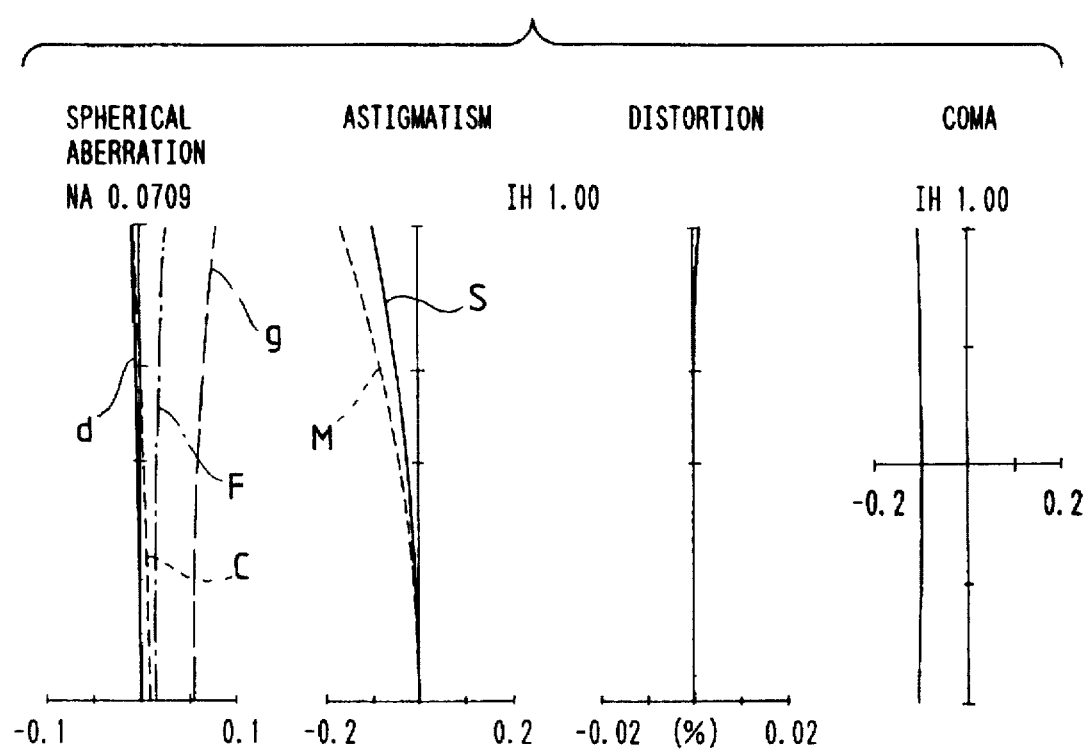

The fourteenth embodiment is perferred as an example wherein aberrations remaining in an image transmitting optical system composed of five relay lens units each of which is the image transmitting optical system preferred as the twelfth embodiment is corrected by using an objective lens system ($r_1$ through $r_{13}$) shown in FIG. 13.

The fifteenth embodiment is an example which has the same composition as that of the tenth embodiment, etc. and comprises aspherical surfaces at the locations closest to the images. These aspherical surfaces serve for correcting the curvature of coma in addition to spherical aberration and astigmatism, thereby making it possible to compose an image transmitting optical system having very high resolution.

When the direction of the optical axis is taken as the x axis and the direction perpendicular to the optical axis is taken as the y axis, the shape of the aspherical surfaces used in the fifteenth embodiment is expressed by the following formula:

$$x = \frac{y^2/r}{1+\sqrt{1-p(y/r)^2}} + Ey^4 + Fy^6 + \ldots$$

wherein the reference symbol r represents a radius of curvature on the aspherical surface as measured in the vicinity of the optical axis, the reference symbol p designates the conical constant, and the reference symbols E, F, ... denote the aspherical surface coefficients.

Further, the numerical data given as the embodiments described above are normalized to an outside diameter of lens element of 2.75 mm and an effective diameter of 2.55 mm.

The image transmitting optical system according to the present invention is capable of allowing light to transmit therethrough in a quantity approximately 5% larger than that of light allowed to transmit through the conventional image transmitting optical system, thereby providing a brighter image. Further, the image transmitting optical system according to the present invention has spherical aberration and astigmatic difference which are corrected more favorably by using the bar-shaped cemented lens components consisting of the two bar-shaped lens elements.

I claim:

1. An image transmitting optical system for reimaging an image of an object comprising:

two bar-shaped lens components each comprising no more than two wherein each of said two bar-shaped lens components is a cemented lens component consisting of a plurality of lens elements; and said transmitting optical system satisfying the following conditions (1) and (3):

$$0.35 > D_1/l > 0.1 \quad (1)$$

$$D_1 > D_3 \quad (3)$$

wherein said reference symbol $D_1$ represents a distance as measured from said image of said object to one of a plurality of refracting surfaces of said two bar-shaped lens components which is located closest to said image of said object, said reference symbol $D_3$ designates a distance as measured from a pupil of said image transmitting optical system to a lens surface having a positive power located closest to said pupil, and said reference symbol l designates a length equal to ½ of a relay length, said relay length being a distance as measured from said object to an image reimaged by said image transmitting optical system.

2. An image transmitting optical system for reimaging an image of an object comprising:

two bar-shaped lens components each comprising no more than two lens elements;

said image transmitting optical system satisfying the following conditions (2), (4) and (6):

$$D_3/l < 0.3 \quad (2)$$

$$0.35 > D_1/l > 0.125 \quad (4)$$

$$D_1 = D_3 \quad (6)$$

wherein said reference symbol $D_1$ represents a distance as measured from said image of said object to one of a plurality of refracting surfaces of said two bar-shaped lens components which is located closest to said image of said object, said reference symbol $D_3$ represents a distance as measured from the pupil of said image transmitting optical system to a lens surface having a positive power located closest to said pupil and said reference symbol l designates a length equal to ½ of a relay length, said relay length being a distance as measured from said image of said object to an image reimaged by said image transmitting optical.

3. An image transmitting optical system for reimaging an image of an object comprising:

two-bar shaped lens components each comprising no more than two lens elements; and said image transmitting optical system satisfying the following conditions (1), (3) and (5):

$$0.35 \geq D_1/l > 0.1 \quad (1)$$

$$D_1 > D_3 \quad (3)$$

$$0.2 \geq D_3/l \geq 0 \quad (5)$$

wherein said reference symbol $D_1$ represents a distance as measured from said image of said object to one of a plurality of refracting surfaces of said two bar-shaped lens components which is located closest to said image of said object, said reference symbol $D_3$ designates a distance as measured from a pupil of said image transmitting optical system to a lens surface having a positive power located closest to said pupil, and said reference symbol l designates a length equal to ½ of a relay length, said relay length being a distance as measured from said image of said object to an image reimaged by said image transmitting optical system.

4. An image transmitting optical system for reimaging an image of an object consisting of:

two bar-shaped lens components each comprising no more than two elements;

each of said two bar-shaped components is a cemented lens component consisting of a plurality of lens elements;

said image transmitting optical system satisfying the following condition (4):

$$0.35 > D_1/l \geq 0.125 \quad (4)$$

wherein said reference symbol $D_1$ represents a distance as measured from said image of said object to one of a plurality of refracting surfaces of said two bar-shaped lens components which is located closest to said image of said object, and said reference symbol l designates a length equal to ½ of a relay length, said relay length being a distance as measured from said image of said object to an image reimaged by said image transmitting optical system.

5. An image transmitting optical system according to claim 1, 2, 3 or 4, said image transmitting optical system further satisfying the following condition:

$$0.9 \geq \kappa \geq 0.5 (\kappa = x/r)$$

wherein said reference symbol x represents a height of said image reimaged by said image transmitting optical system and said reference symbol r designates an effective radius of each of said bar-shaped lens components.

6. An image transmitting optical system according to claim 1, 2 or 4, said image transmitting optical system further satisfying the following condition (2):

$$D_3/l \leq 0.3 \quad (2)$$

wherein said reference symbol $D_3$ represents a distance as measured from the pupil of said image transmitting optical system to a lens surface having a positive power located closest to said pupil.

7. An image transmitting optical system according to claim 1, 2, 3, or 4, wherein each of said two bar-shaped lens components comprises:

a bar-shaped element, and a lens element cemented to a pupil side surface of said bar-shaped lens element, either of said bar-shaped lens element and said lens elements has a refractive index and an Abbe's number which are higher and smaller, respectively, than those of the other of said bar-shaped lens element and said lens element.

8. An image transmitting optical system according to claim 1, 2, 3 or 4, wherein:

each of said two bar-shaped lens components comprises at least one aspherical surface.

9. An imaging transmitting optical system according to claim 1 or 3, wherein each of said two bar-shaped lens components comprise:

at least two bar-shaped lens elements each having a thickness larger than twice an outside diameter thereof.

10. An image transmitting optical system according to claim 1 or 4, wherein said image transmitting optical system further satisfies the following condition (3'):

$$0.7 D_1 > D_3. \quad (3')$$

11. An image transmitting optical system according to claim 1, wherein:

said optical system further satisfies the following condition (3):

$$D_1 > D_3 \quad (3)$$

wherein said reference symbol $D_3$ designates a distance as measured from a pupil of said image transmitting optical system to a lens surface of said image transmitting optical system having a refractive power and being located closest to said pupil; and a vignetting factor on a marginal portion of said image transmitting optical system is at least 70%.

12. An image transmitting optical system according to claim 2 or 4, wherein each of said two bar-shaped lens components each consist of:

a first bar-shaped lens element; and a second bar-shaped lens element, and at least one cemented surface having a negative refractive power.

13. An image transmitting optical system according to claim 2 or 4, wherein each of said two bar-shaped lens components include:

a cemented surface having a negative refractive power.

14. An image transmitting optical system according to claim 4, wherein said image transmitting optical system further satisfies the following condition (3):

$$D_1 > D_3 \quad (3)$$

wherein said reference symbol $D_3$ designates a distance as measured from a pupil of said image transmitting optical system to one of a plurality of lens surfaces of said image transmitting optical system which has a refractive power and which is located closest to said pupil.

15. An image transmitting optical system for reimaging an image of an object comprising:

two bar-shaped lens components each comprising no more than two lens elements;

said transmitting optical system satisfying the following conditions:

$$0.35 \geq D_1/l > 0.1 \quad (1)$$

$$D_3/l < 0.3 \quad (2)$$

$$D_1 > D_3 \quad (3)$$

wherein said reference symbol $D_1$ represents a distance as measured from said image of said object to one of a plurality of refracting surfaces of said two bar-shaped lens components which is located closest to said image of said object, said reference symbol $D_3$ designates a distance as measured from a pupil of said image transmitting optional system to a lens surface having a positive power located closest to said pupil, and said reference symbol l designates a length equal to ½ of a relay length, said relay length being a distance as measured from said image of said object to an image reimaged by said image transmitting optical system.

16. An image transmitting optical system for reimaging an image of an object consisting of:

two bar-shaped lens components each comprising no more than two elements;

each of said two bar-shaped lens components is a cemented lens component consisting of a plurality of lens elements;

said image transmitting optical system satisfying the following conditions:

$$0.35 > D_1/l > 0.1 \quad (1)$$

$$D_1 > D_3 \quad (3)$$

wherein said reference symbol $D_1$ represents a distance as measured from said image of said object to one of a plurality of refracting surfaces of said two bar-shaped lens components which is located closest to said image of said object, said reference symbol $D_3$ designates a distance as measured from a pupil of said image transmitting optical system to a lens surface located closest to said pupil, and said reference symbol l designates a length equal to ½ of a relay length, said relay length being a distance as measured from said object to an image reimaged by said image transmitting optical system.

* * * * *